US007312824B2

(12) United States Patent
Takano et al.

(10) Patent No.: US 7,312,824 B2
(45) Date of Patent: Dec. 25, 2007

(54) IMAGE-CAPTURING APPARATUS, IMAGE PROCESSING APPARATUS AND IMAGE RECORDING APPARATUS

(75) Inventors: Hiroaki Takano, Hachioji (JP); Tsukasa Ito, Musashino (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 794 days.

(21) Appl. No.: 10/829,142

(22) Filed: Apr. 21, 2004

(65) Prior Publication Data

US 2004/0212688 A1 Oct. 28, 2004

(30) Foreign Application Priority Data

Apr. 25, 2003 (JP) ............................ 2003-122663

(51) Int. Cl.
*H04N 3/14* (2006.01)
*H04N 5/335* (2006.01)
*H04N 9/04* (2006.01)
*H04N 9/083* (2006.01)

(52) U.S. Cl. ...................................... 348/294; 348/275

(58) Field of Classification Search ................ 348/300, 348/207.99, 222.1, 267, 275, 279, 294, 302; 382/164
See application file for complete search history.

(56) References Cited

U.S. PATENT DOCUMENTS 6,160,593 A * 12/2000 Nakakuki .................. 348/279
6,636,630 B1 * 10/2003 Adachi et al. .............. 382/164
6,822,752 B1 * 11/2004 Gotoh et al. ............... 382/165
6,831,692 B1 * 12/2004 Oda .......................... 348/275
7,095,441 B2 * 8/2006 Nagano ...................... 348/276
2002/0163583 A1 * 11/2002 Jones ......................... 348/272
2004/0057617 A1 * 3/2004 Miyawaki et al. .......... 382/167
2004/0109068 A1 * 6/2004 Mitsunaga et al. ...... 348/222.1
2004/0135899 A1 * 7/2004 Suemoto ................. 348/223.1
2004/0169749 A1 * 9/2004 Acharya .................. 348/222.1
2006/0001751 A1 * 1/2006 Abe et al. .................. 348/300

* cited by examiner

*Primary Examiner*—Lin Ye
*Assistant Examiner*—Jason Whipkey
(74) *Attorney, Agent, or Firm*—Lucas & Mercanti, LLP

(57) ABSTRACT

There is described an image-capturing apparatus, which has plural kinds of image sensors, sensitivities of which are different relative to each other, for recording wide dynamic range image data, and an image processing apparatus for applying optimization processing to the wide dynamic range image data. The image capturing apparatus includes a scene-referred raw data generating section to generate scene-referred raw data sets; a scene-referred image data synthesizing section to synthesize scene-referred image data; a synthesizing-information data generating section to generate synthesizing-information data; an output-referred image data generating section to generate output-referred image data by applying an optimization processing to the scene-referred image data; a differential data generating section to generate differential data between the scene-referred image data and the output-referred image data; and a controlling section to store the output-referred image data attached with the synthesizing-information data and the differential data into a storage medium.

19 Claims, 14 Drawing Sheets

| |
|---|
| SYNTHESIZING INFORMATION DATA |
| DIFFERENTIAL DATA |
| OUTPUT-REFERRED IMAGE DATA |

IMAGE-CAPTURING APPARATUS, IMAGE PROCESSING APPARATUS AND IMAGE RECORDING APPARATUS

BACKGROUND OF THE INVENTION

The present invention relates to an image-capturing apparatus for recording a wide dynamic range image data by image capturing, an image processing apparatus for applying optimization processing for forming an output-referred image on the outputting medium, to such a wide dynamic range image data by image capturing, and an image recording apparatus.

At present, the digital image data captured by an image-capturing apparatus is distributed through such a memory device as a CD-R (Compact Disk Recordable), floppy disk (registered trade name) and memory card or the Internet, and is displayed on such a display monitor as a CRT (Cathode Ray Tube), liquid crystal display and plasma display or a small-sized liquid crystal monitor display device of a cellular phone, or is printed out as a hard copy image using such an output device as a digital printer, inkjet printer and thermal printer. In this way, display and print methods have been diversified in recent years.

When digital image data is displayed and output for viewing, it is a common practice to provide various types of image processing typically represented by gradation adjustment, brightness adjustment, color balancing and enhancement of sharpness to ensure that a desired image quality is obtained on the display monitor used for viewing or on the hard copy.

In response to such varied display and printing methods, efforts have been made to improve the general versatility of digital image data captured by an image-capturing apparatus. As part of these efforts, an attempt has been made to standardize the color space represented by digital RGB (Red, Green and Blue) signals into the color space that does not depend on characteristics of an image-capturing apparatus. At present, large amounts of digital image data have adopted the sRGB (See Multimedia Systems and Equipment—Color Measurement and Management—Part 2-1: Color Management—Default RGB Color Space—sRGB" IEC61966-2-1) as a standardized color space. The color space of this sRGB has been established to meet the color reproduction area for a standard CRT display monitor.

Generally, a digital camera is equipped with an image sensor, serving as an image-capturing device (CCD type image sensor, hereinafter also referred to as "CCD" for simplicity) having a photoelectric conversion function with color sensitivity provided by a combination of a CCD (charge coupled device), a charge transfer device and a mosaic color filter. The digital image data output from the digital camera is obtained after the electric original signal gained by conversion via the CCD has been corrected by the photoelectric conversion function of the image sensor, and processing of file conversion and compression into the predetermined data format standardized to permit reading and display by image editing software.

Correction by the photoelectric conversion function of the image sensor includes, for example, gradation correction, spectral sensitivity, crosstalk correction, dark current noise control, sharpening, white balance adjustment and color saturation adjustment. The above-mentioned standardized data format widely known includes Baseline Tiff Rev. 6.0 RGB Full Color Image adopted as a non-compressed file of the Exif (Exchangeable Image File Format) file and compressed data file format conforming to the JPEG format.

The Exif file conforms to the above-mentioned sRGB, and the correction of the photoelectric conversion function of the above-mentioned image-capturing element is established so as to ensure the most suitable image quality on the display monitor conforming to the sRGB.

For example, if a digital camera has the function of writing into the header of the digital image data the tag information for display in the standard color space (hereinafter referred to as "monitor profile") of the display monitor conforming to the sRGB signal, and accompanying information indicating the device dependent information such as the number of pixels, pixel arrangement and number of bits per pixel as meta-data as in the case of Exif format, and if only such a data format is adopted, then the tag information can be analyzed by the image edit software (e.g. Photoshop by Abode for displaying the above-mentioned digital image data on the digital display monitor, conversion of the monitor profile into the sRGB can be prompted, and modification can be processed automatically. This capability reduces the differences in apparatus characteristics among different displays, and permits viewing of the digital image data photographed by a digital camera under the optimum condition.

In addition to the above-mentioned information dependent on device type, the above-mentioned accompanying information includes; information directly related to the camera type (device type) such as a camera name and code number, information on photographing conditions such as exposure time, shutter speed, f-stop number (F number), ISO sensitivity, brightness value, subject distance range, light source, on/off status of a stroboscopic lamp, subject area, white balance, zoom scaling factor, subject configuration, photographing scene type, the amount of reflected light of the stroboscopic lamp source and color saturation for photographing, and tags (codes) for indicating the information related to a subject. The image editing software and output device have a function of reading the above-mentioned accompanying information and making the quality of hardware image more suitable.

The image displayed on such a display device as a CRT display monitor and the hard copy image printed by various printing devices have different color reproduction areas depending on the configuration of the phosphor or color material to be used. For example, the color reproduction area of the CRT display monitor corresponding to the sRGB standard space has a wide bright green and blue area. It contains the area that cannot be reproduced by the hard copy formed by a silver halide photographic printer, ink-jet printer and conventional printer. Conversely, the cyan area of the conventional printing or inkjet printing and the yellow area of the silver halide photographic printing contain the area that cannot be reproduced by the CRT display monitor corresponding to the sRGB standard color space. (For example, see "Fine imaging and digital photographing" edited by the Publishing Commission of the Japan Society of Electrophotography, Corona Publishing Co., P. 444). In the meantime, some of the scenes of the subject to be photographed may contain the color in the area that cannot be reproduced in any of these areas for color reproduction.

As described above, the color space (including the sRGB) optimized on the basis of display and printing by a specific device is accompanied by restrictions in the color gamut where recording is possible. So when recording the information picked up by a photographing device, it is necessary to make adjustment of mapping by compressing the information into the color gamut where recording is allowed. The simplest way is provided by clipping where the color chromaticity point outside the color gamut where recording is possible is mapped onto the boundary of the nearest color gamut. This causes the gradation outside the color gamut to be collapsed, and the image will give a sense of incompatibility to the viewer. To avoid this problem, non-liner compression method is generally used. In this method, the chromaticity point in the area where chroma is high in excess of an appropriate threshold value is compressed smoothly according to the size of the chroma. As a result, chroma is compressed and recording is carried out even at the chromaticity point inside the color gamut where recording is possible. (For the details of the procedure of mapping the color gamut, see "Fine imaging and digital photographing" edited by the Publishing Commission of the Japan Society of Electrophotography, Corona Publishing Co., P. 447, for example).

The image displayed on such a display device as a CRT display monitor, the hard copied image printed by various types of printing devices, or color space (including sRGB) optimized on the basis of display and printing by these devices are restricted to the conditions where the area of brightness that allows recording and reproduction is of the order of about 100 to 1. By contrast, however, the scene of the subject to be photographed has a wide area of brightness, and it often happens that the order of several thousands to 1 is reached outdoors. (See "Handbook on Science of Color, New Version, 2nd Print" by Japan Society for Science of Colors, Publishing Society of the University of Tokyo, P. 926, for example). Accordingly, when recording the information gained by the image sensor, compression is also necessary for brightness. In this processing, adequate conditions must be set for each image in conformity to the dynamic range of the scene to be photographed, and the range of brightness for the main subject in the scene to be photographed.

However, when compression has been carried out for the color gamut and brightness area as described above, information on gradation prior to compression or information prior to clipping is lost immediately due to the principle of the digital image to be recorded in terms of the discrete value. The original state cannot be recovered. This imposes a big restriction on the general versatility of high-quality digital image.

For example, when the image recorded in the sRGB standard color space is printed, mapping must be carried out again based on the differences between the sRGB standard color space and the area for color reproduction of the printing device. For the image recorded in the sRGB standard color space, however, the information on gradation in the area compressed at a time of recording is lost. So the smoothness of gradation is deteriorated as compared to the case where the information captured by the photographing device is mapped directly in the area for color reproduction of the printing device. Further, if gradation compression conditions are not adequate at a time of recording, and there are problems such as a whitish picture, dark face, deformed shadow and conspicuous white skipping in the highlighted area, improvement is very inadequate as compared to the case where the new image is created again from the information gained by the photographing device, even if the gradation setting is changed to improve the image. This is because information on gradation prior to compression, and information on the portion subjected to deformation or white skipping have been already lost.

As a solution of the above-mentioned problems, the art of storing the process of image editing as a backup data and returning it to the state prior to editing whenever required has long been known. For example, Patent Document 1 discloses a backup device wherein, when the digital image is subjected to local modification by image processing, the image data on the difference between the digital image data before image processing and that after image processing is saved as backup data. Further, Patent Document 2 discloses a method for recovering the digital image data before editing, by saving the image data on the difference between the digital image data before image processing and that after image processing. These technologies are effective from the viewpoint of preventing information from being lost, but the number of sheets that can be photographed by a camera is reduced with the increase in the amount of data recorded in the media.

The problems introduced above are caused by the procedure where the information on the wide color gamut and brightness area gained by a photographing device is recorded after having being compressed into the output-referred image data in the state optimized by assuming an image to be viewed. By contrast, if the information on the wide color gamut and brightness area gained by a photographing device is recorded as scene-referred image data that is not compressed, then inadvertent loss of information can be prevented. The standard color space suited to record such scene-referred image data is proposed, for example, by RIMM RGB (Reference Input Medium Metric RGB) and ERIMM RGB (Extended Reference Input Medium Metric RGB). (See the Journal of Imaging Science and Technology, Vol. 45 pp. 418 to 426 (2001)).

However, the data expressed in the standard color space like the one described above, is not suitable for being displayed directly on the display monitor and viewed. Generally, a digital camera has a built-in display monitor or is connected to it in order for the user to check the angle of view before photographing or to check the photographed image after photographing. When photographed data is recorded as output referred image data like the sRGB, it can be displayed directly on the display monitor, without the data being converted. Despite this advantage, when the photographed data is recorded as scene-referred image data, the data must be subjected to the processing of re-conversion into the output-referred image data in order to display that data.

Patent Document 3 discloses an image processing apparatus characterized by two modes; a mode of recording in the form of an image signal displayed on the display means and a mode of recording in the form of captured image signal. The form of image signal in the latter case is generally called RAW data. Using the special-purpose application software (called "development software"), such digital image data can be converted into output-referred image data of the above-mentioned Exif file or the like for display or printing (called "electronic development" or simply "development"). Since the RAW data retains all information at a time of photographing, it permits output-referred image data to be remade. If other color system files such as CMYK are created directly, there will no inadvertent modification of the color system due to the difference in color gamut from the display monitor (sRGB). However, the RAW data is recorded according to the color space based on the spectral sensitivity characteristics inherent to the type of a photographing apparatus and the file format inherent to the type of a photographing apparatus. Accordingly, image suitable to display and printing can be obtained only when special-purpose development software inherent to the type of the photographing apparatus is used.

The above description is concerned with a commonly used digital camera. Needless to say, it is preferred that the image-capturing apparatus itself be improved so as to get information on a wider color and brightness range than the conventional products. The solid image sensor has a limited dynamic range with respect to the intensity of incoming light. The Patent Document 4 discloses a method wherein a low-sensitivity image sensor and high-sensitivity image sensor are provided, and the value obtained by level conversion of the output of each of these devices is compared with a reference voltage; thus, the dynamic range of the signal obtained by photoelectric conversion of the intensity of incoming light is expanded by instantaneous switching of the output of either of the level values.

The Patent Document 5 discloses a technique wherein the first light receiving devices (high-sensitivity image sensor) and second light receiving devices (low-sensitivity image sensor) of the image sensor are arranged in a honeycomb figure in positions displaced, in the direction of vertical column and/or and horizontal row with respect to each other in terms of the centers of the geometrical profile of the image sensor, by half the pitch representing the interval between light receiving devices, namely, by ½ pitch; and the signal saturation level of the first light receiving device is adjusted for synthesization between the first and second signal.

Patent Document 6 discloses the method wherein the image sensor generates the high-sensitivity video signal and low-sensitivity video signal, and addition is made in terms of sensitivity ratio, if the high quantization data is saturated subsequent to quantization of the high-sensitivity video signal by high quantizing resolution and low-sensitivity video signal by low quantizing resolution, and the high quantization data is selected otherwise, thereby forming a wider dynamic range image.

Further, the Patent Document 7 describes the art of selecting the output values of the low-sensitivity image sensor and high-sensitivity image sensor according to the exposure area, and Patent Document 8 shows the method for selecting the output value of the low-sensitivity image sensor and high-sensitivity image sensor without moiré.

[Patent Document 1]
Tokkaihei 7-57074
[Patent Document 2]
Tokkai 2001-94778
[Patent Document 3]
Tokkaihei 11-261933
[Patent Document 4]
Tokkohei 8-34558
[Patent Document 5]
Tokkai 2000-125209
[Patent Document 6]
Tokkai 2001-8104
[Patent Document 7]
Tokkai 2003-18445
[Patent Document 8]
Tokkai 2003-18479

In a digital camera having the image-capturing section obtained by high integration of image sensors with different characteristics, loss of information can be avoided by referring to the information on wide color range and brightness as a non-compressed scene-referred image data (e.g. [scRGB], [RIMM RGB] and [ERIMM RGB]). However, the abovementioned technology has problems in that it fails to enable viewing by display on the aforementioned camera display monitor, and to overcome the variations of the image quality due to the camera model inherent problem, similarly to the case of raw data or the difficulty in optimization of the image quality for use in display and printing. This has created a problem in the prior art.

SUMMARY OF THE INVENTION

To overcome the abovementioned drawbacks in conventional image capturing apparatus, image processing apparatus and image recording apparatus, the first object of the present invention is to record the captured image information of a wide dynamic range free from information loss, using a general-purpose method, and the second object of the present invention is to provide an image-capturing apparatus capable of quick display of the captured image on a display monitor, an image processing apparatus capable of easy editing and processing of the captured image information of a wide dynamic range image recorded by an image-capturing apparatus, and an image recording apparatus having the abovementioned features.

Accordingly, to overcome the cited shortcomings, the abovementioned object of the present invention can be attained by image capturing apparatus, image processing apparatus and image recording apparatus described as follow.

(1) An image capturing apparatus having plural kinds of image sensors, sensitivities of which are different relative to each other, comprising: a scene-referred raw data generating section to generate scene-referred raw data sets, each of which is acquired from each of the plural kinds of image sensors through an image capturing operation; a scene-referred image data synthesizing section to synthesize scene-referred image data by combining at least two of the scene-referred raw data sets with each other into a standardized form;—a synthesizing-information data generating section to generate synthesizing-information data for decomposing the scene-referred image data into the at least two of the scene-referred raw data sets; an output-referred image data generating section to generate output-referred image data by applying an optimization processing to the scene-referred image data, so that a visual image optimized for an output medium can be formed on the output medium, based on the output-referred image data; a differential data generating section to generate differential data between the scene-referred image data and the output-referred image data; and a controlling section to control a data-recording operation, so that the synthesizing-information data and the differential data are attached to the output-referred image data in order to store all of them into a storage medium.

(2) The image-capturing apparatus of item 1, wherein the controlling section controls the data-recording operation, so that image-capturing information data, representing an image-capturing condition, are also attached to the output-referred image data in order to store all of them into a storage medium.

(3) The image-capturing apparatus of item 1, wherein the plural kinds of image sensors include a high-sensitive image sensor and a low-sensitive image sensor; and wherein the scene-referred raw data sets include a high-sensitivity scene-referred raw data set, acquired from the high-sensitive image sensor through the image-capturing operation, and a low-sensitivity scene-referred raw data set, acquired from the low-sensitive image sensor through the image-capturing operation.

(4) The image-capturing apparatus of item 3, wherein the high-sensitivity scene-referred raw data set represents a monochrome image, which includes only luminance information captured through the image-capturing operation, while the low-sensitivity scene-referred raw data set represents a color image captured through the image-capturing operation.

(5) The image-capturing apparatus of item 3, wherein the high-sensitive image sensor includes a plurality of first photosensitive elements and the low-sensitive image sensor includes a plurality of second photosensitive elements; and wherein the plurality of first photosensitive elements and the plurality of second photosensitive elements are arranged within a same image area in such a manner that the first photosensitive elements and the second photosensitive elements are staggered relative to each other in both horizontal and vertical directions of the image area, like as a honeycomb pattern.

(6) The image-capturing apparatus of item 1, further comprising: an instruction inputting section to input instructed contents of an correction processing of image sensor characteristics into the scene-referred image data synthesizing section; wherein the scene-referred image data synthesizing section applies the correction processing of the image sensor characteristics to the at least two of the scene-referred raw data sets, based on the instructed contents inputted by the instruction inputting section, before combining them with each other.

(7) The image-capturing apparatus of item 1, wherein a color space of the scene-referred image data is defined by anyone of scRGB, RIMM RGB, ERIMM RGB, and a color space of the output-referred image data includes anyone of sRGB, ROMM RGB.

(8) An image-processing apparatus, comprising: an inputting section to input output-referred image data generated by an image-capturing apparatus having plural kinds of image sensors whose sensitivities are different relative to each other, differential data attached to the output-referred image data, and synthesizing-information data for decomposing scene-referred image data, which are generated by processing both the output-referred image data and the differential data, into a plurality of scene-referred raw data sets; a scene-referred image data synthesizing section to synthesize scene-referred image data by combining the output-referred image data and the differential data with each other into a standardized form; a scene-referred raw data generating section to generate the plurality of scene-referred raw data sets, by decomposing the scene-referred image data, based on the synthesizing-information data; and an output-referred image data generating section to generate new output-referred image data by applying an optimization processing to the plurality of scene-referred raw data sets, so that a visual image optimized for an output medium can be formed on the output medium, based on the new output-referred image data.

(9) The image-processing apparatus of item 8, wherein the inputting section also inputs image-capturing information data representing an image-capturing condition; and wherein the output-referred image data generating section employs the image-capturing information data when applying the optimization processing to the plurality of scene-referred raw data sets, in order to generate the new output-referred image data.

(10) The image-processing apparatus of item 8, wherein the plural kinds of image sensors include a high-sensitive image sensor and a low-sensitive image sensor; and wherein the scene-referred raw data sets include a high-sensitivity scene-referred raw data set, acquired from the high-sensitive image sensor, and a low-sensitivity scene-referred raw data set, acquired from the low-sensitive image sensor.

(11) The image-processing apparatus of item 10, wherein the high-sensitivity scene-referred raw data set represents a monochrome image, which includes only luminance information of a captured image, while the low-sensitivity scene-referred raw data set represents a color image.

(12) The image-processing apparatus of item 8, further comprising: an instruction inputting section to input instructed contents of an correction processing of image sensor characteristics into the output-referred image data generating section; wherein the output-referred image data generating section applies the correction processing of the image sensor characteristics to the plurality of scene-referred raw data sets, based on the instructed contents inputted by the instruction inputting section, before applying the optimization processing to them.

(13) The image-processing apparatus of item 1, wherein a color space of the scene-referred image data is defined by anyone of scRGB, RIMM RGB, ERIMM RGB, and a color space of the output-referred image data includes anyone of sRGB, ROMM RGB.

(14) An image-recording apparatus, comprising: an inputting section to input output-referred image data generated by an image-capturing apparatus having plural kinds of image sensors whose sensitivities are different relative to each other, differential data attached to the output-referred image data, and synthesizing-information data for decomposing scene-referred image data, which are generated by processing both the output-referred image data and the differential data, into a plurality of scene-referred raw data sets; a scene-referred image data synthesizing section to synthesize scene-referred image data by combining the output-referred image data and the differential data with each other into a standardized form; a scene-referred raw data generating section to generate the plurality of scene-referred raw data sets, by decomposing the scene-referred image data, based on the synthesizing-information data; an output-referred image data generating section to generate new output-referred image data by applying an optimization processing to the plurality of scene-referred raw data sets; and an image-forming section to form an visual image on an output medium, based on the new output-referred image data optimized for the output medium.

(15) The image-recording apparatus of item 14, wherein the inputting section also inputs image-capturing information data representing an image-capturing condition; and wherein the output-referred image data generating section employs the image-capturing information data when applying the optimization processing to the plurality of scene-referred raw data sets, in order to generate the new output-referred image data.

(16) The image-recording apparatus of item 14, wherein the plural kinds of image sensors include a high-sensitive image sensor and a low-sensitive image sensor; and wherein the scene-referred raw data sets include a high-sensitivity scene-referred raw data set, acquired from the high-sensitive image sensor, and a low-sensitivity scene-referred raw data set, acquired from the low-sensitive image sensor.

(17) The image-recording apparatus of item 16, wherein the high-sensitivity scene-referred raw data set represents a monochrome image, which includes only luminance information of a captured image, while the low-sensitivity scene-referred raw data set represents a color image.

(18) The image-recording apparatus of item 14, further comprising: an instruction inputting section to input instructed contents of an correction processing of image sensor characteristics into the output-referred image data generating section; wherein the output-referred image data generating section applies the correction processing of the image sensor characteristics to the plurality of scene-referred raw data sets, based on the instructed contents inputted by the instruction inputting section, before applying the optimization processing to them.

(19) The image-recording apparatus of item 14, wherein a color space of the scene-referred image data is defined by anyone of scRGB, RIMM RGB, ERIMM RGB, and a color space of the output-referred image data includes anyone of sRGB, ROMM RGB.

Further, to overcome the abovementioned problems, other image-capturing apparatus, image-processing apparatus and image-recording apparatus, embodied in the present invention, will be described as follow:

(20) An image-capturing apparatus, characterized in that, in the image-capturing apparatus having at least two kinds of image sensors, sensitivities of which are different form each other, there are provided:

a scene-referred raw data generating means for generating scene-referred raw data for each of the image sensors by photographing;

a scene-referred image data generating means for generating synthesized and standardized scene-referred image data from at least two scene-referred raw data sets generated in the above;

a synthesizing-information data generating means for generating synthesizing-information data for decomposing the scene-referred image data into the scene-referred raw data sets;

an output-referred image data generating means for generating output-referred image data by applying an image-processing, for optimizing a visual image formed on an output medium, to the scene-referred image data generated in the above;

a differential data generating means for generating differential data between the scene-referred image data generated in the above and the output-referred image data generated in the above; and a record-controlling means for attaching the synthesizing-information data and the differential data to the output-referred image data, and further, storing them into media.

According to the image-capturing apparatus described in item 20, the scene-referred raw data for each of the image sensors, sensitivities of which are different form each other, are generated, and the synthesized and standardized scene-referred image data are generated from the at least two scene-referred raw data sets generated in the above while generating the synthesizing-information data for decomposing the scene-referred image data into the scene-referred raw data sets, and then, the output-referred image data are generated by applying the image-processing, for optimizing a visual image formed on an output medium, such as a camera monitor, etc., to the scene-referred image data generated in the above while generating the differential data between the scene-referred image data generated in the above and the output-referred image data generated in the above, and finally, the synthesizing-information data and the differential data are attached to the output-referred image data so as to store them into the media.

Thus, a wide dynamic range image without information loss can be recorded by generating the scene-referred raw data as direct raw output data of the image sensor that records the faithful information on a subject, for each of the image sensors, sensitivities of which are different relative to each other. Further, a quick display of the photographed image is enabled by the generation of the output-referred image data optimized for viewing on the output medium such as a camera monitor through generation of a scene-referred image data set of a standardized form synthesized by combining the scene-referred raw data sets. Further, the system records the information on whether each pixel of the scene-referred image data is derived from low-sensitivity or high-sensitivity device and obtains the difference between the scene-referred image data and output-referred image data. Such information is recorded in the form associated with the output-referred image data. This makes it possible to retain information at the time of photographing.

The term "generate" appearing in the description of the present Specification refers to the act of a new image signal or data being produced by a program and processing circuit working in the image-capturing apparatus, image processing apparatus and image recording apparatus according to the present invention. The term "create" may be used synonymously with it.

The "image-capturing apparatus" is an apparatus equipped with an image sensor (image sensor) having a photoelectric conversion function, and includes what is called a digital camera and scanner. An example of the aforementioned image sensor, a CCD type image sensor combined with the complementary mosaic filter to yield color sensitivity, and a CMOS type image sensor. The present invention is characterized by a combined use of at least two types of image sensors having different sensitivities. An example of the combined use of image sensors having different sensitivities is found in the image sensor having individual differences disclosed in the Tokkai 2000-125209, wherein the high-sensitivity image sensors and low-sensitivity image sensors are arranged in a honeycomb figure in positions displaced, in the direction of vertical column and/or and horizontal row with respect to each other in terms of the centers of the geometrical profile of the image sensor, by half the pitch representing the interval between light receiving devices, namely, by ½ pitch. The image sensors of the present invention are preferred to be arranged in a honeycomb configuration, as shown in FIG. 2. The output current of these image sensors is digitalized by the analog-to-digital converter. The contents of each color channel in this phase are the signal intensity based on the spectral sensitivity inherent to the image sensor.

The above-mentioned "scene-referred raw data" denotes a raw signal directly outputted from the image-capturing apparatus with information on a subject being faithfully recorded. It refers to the data digitized by the analog-to-digital converter and the same data having been subjected to correction of such a noise as fixed pattern noise and dark current noise. It includes the above-mentioned RAW data. This scene-referred raw data is characterized by omission of the image processing for modifying the contents of data to improve such effects in image viewing as gradation conversion, sharpness enhancement and color saturation enhancement, and processing of mapping the signal intensify of each color channel based on the spectral sensitivity inherent to the image sensor, onto the standardized color space such as the above-mentioned RIMM and sRGB. The amount of information on the scene-referred raw data (e.g. number of gradations) is preferred to be equal to greater than that of the information required by the output-referred data (e.g. number of gradations), in conformity to the performances of the above-mentioned analog-to-digital converter. For example, when the number of gradations for the output-referred data is 8 bits per channel, the number of gradations for the scene-referred raw data is preferred to be 12 bits or more. It is more preferred to be 14 bits or more, and still more preferred to be 16 bits or more.

The first feature of the image-capturing apparatus of the present invention is that the aforementioned "scene-referred raw data" is generated for each type of the image-capturing apparatuses, the sensitivities of which are different with respect to each other, thereby getting an image of wide dynamic range.

The "sensitivity" in the sense in which it is used here refers to the indicator representing the response characteristics with respect to the brightness of a subject. It means that an image sensor having a higher sensitivity can respond to a darker subject. Generally, the sensitivity of the image sensor is increased in proportion to the light receiving area of the image sensor. Even when light is completely cut off, the image sensor produces a weak noise signal (called a dark current noise or white noise). This noise signal increases in proportion to the gain value for adjusting the sensitivity gain of the image sensor. The intensity of the noise signal issued by the image sensor when light is cut off is inversely proportional to the light receiving area. Thus, when two types of image sensors—low-sensitivity image sensor and high-sensitivity image sensor—are used, it is preferred that the high-sensitivity image sensor have a greater light receiving area than the low-sensitivity image sensor or the number arranges per unit area be greater. Further, it is preferred that the high-sensitivity image sensor be a monochrome device, without any color sensitivity (color difference sensitivity), responding only to the brightness of the subject.

The "dynamic range" can be defined as an indicator to represent the response characteristics with respect to the range of the brightness of a subject. It means that an image sensor having a wide dynamic range can respond to a wider scope of subjects ranging from a darker subject to a brighter subject. Generally, the dynamic range of an image sensor depends on the material and structure of the light receiving section of the image sensor. A device using a semiconductor such as a photodiode cannot get a sufficient dynamic range. An image sensor having a higher sensitivity can respond to a darker subject, but the dynamic range is insufficient for a brighter subject. The signal tends to get saturated. In the case of an image sensor of lower sensitivity, on the other hand, the signal is not easily saturated with respect to a brighter subject, and the image sensor of lower sensitivity can respond thereto. However, sensitivity is insufficient for a darker subject. Accordingly, at least two types of image sensors—a high-sensitivity image sensor and a low-sensitivity image sensor—are utilized, and, to expand the dynamic range, the overlap between respective dynamic ranges is preferred to be minimized.

In the present invention, the quantization resolution (hereinafter referred to as "number of gradations") of the scene-referred raw data generated for each sensitivity level of the image sensor can be the same. The high-sensitivity image sensor is preferred to have a greater number of gradations than the low-sensitivity image sensor. Further, the response characteristics of the image sensor with respect to the subject brightness, as shown in FIG. 3, is preferred to be linear, but may be different for each sensitivity level. Further, the low-sensitivity image sensor is preferred to be composed of three types having different color sensitivities (difference sensitivities).

The term "synthesized scene-referred image data set of a standardized form" used in the specification of the present application refers to the image data obtained by applying processing of mapping the signal intensity of each color channel based on at least the spectral sensitivity of the image sensor itself to the standard color space such as the aforementioned scRGB, RIMM RGB and ERIMM RGB, to a plurality of scene-referred raw data generated for each sensitivity level of the image sensor, and by applying the processing of synthesization so as to achieve optimization within the information capacity that can be retained as a single image data set, based on the brightness, dynamic range and others of the major subject. The term signifies the image data where image processing of modifying the data contents as to improve the effect of viewing the image such as gradation conversion, sharpness enhancement and color saturation enhancement is omitted. It is preferred that the scene-referred raw data be subjected to correction (opto-electronic conversion function defined in ISO1452, e.g. "Fine imaging and digital photographing" edited by the Publishing Commission of the Japan Society of Electrophotography, Corona Publishing Co., P. 449 of the photoelectric conversion characteristics of the image-capturing apparatus. This processing makes it possible to get a single "synthesized scene-referred image data set of a standardized form where the difference of signal values between different "image-capturing apparatuses" is corrected, while maintaining the amount of information shared among a plurality of "scene-referred raw data".

It is preferred that the amount of the synthesized scene-referred image data set of a standardized form (e.g. number of gradations) be equal to or greater than the amount of information (e.g. the number of gradations) required by the output-referred image data (to be described later) according to the performance of the aforementioned analog-to-digital converter. For example, when the number of gradations of the output-referred image data is 8 bits per channel, the number of gradations of the scene-referred image data should preferably be 12 bits or more, and more preferably 16 bits or more.

In the present invention, it is also possible to arrange such a configuration that "correction processing of image sensor characteristics" be applied to the scene-referred raw data.

In the description of the specification of the present application, correction processing of image sensor characteristics refers to the conversion into the "synthesized scene-referred image data set of a standardized form", using the scene-referred raw data dependent on the image sensor characteristics. This processing includes the processing of mapping the signal intensity of each color channel based on at least the spectral sensitivity inherent to the image sensor to the standard color space such as the aforementioned scRGB, RIMM RGB and ERIMM RGB. For example, this processing must be applied if the scene-referred raw data dependent on the image sensor characteristics is not subjected to the processing of compensation based on the arrangement of the color film. (For the details of the compensation based on the color filter arrangement, see "Fine imaging and digital photographing" edited by the Publishing Commission of the Japan Society of Electrophotography, Corona Publishing Co., P. 51). In addition to the above, it is possible to apply all processing such as gradation conversion, smoothing, sharpening, noise elimination and moiré elimination.

The "outputting medium" appearing in the present invention is defined as including such a display device as CRT, liquid crystal display and plasma display, or such paper for generation of a hard copy image as silver halide photographic paper, inkjet paper and thermal printing paper.

The "output-referred image data" (also referred to as "visual image referred image data") denotes digital image data that is used by such a display device as CRT, liquid crystal display and plasma display, or by the output device for generation of a hard copy image on such an outputting medium as silver halide photographic paper, inkjet paper and thermal printing paper. The output-referred image data is provided with "optimization processing" in order to obtain the optimum image on such a display device as CRT, liquid crystal display and plasma display, or such an outputting medium as silver halide photographic paper, inkjet paper and thermal printing paper. For instance, it is desirable that the color space of the output-referred image data optimized for displaying on the camera monitor is sRGB.

The "Optimization processing" is provided to ensure the optimum image on such display device as CRT, liquid crystal display and plasma display, or such an outputting medium as silver halide photographic paper, inkjet paper and thermal printing paper. For example, when display is given on the CRT display monitor conforming to the sRGB standard, processing is provided in such a way that the optimum color reproduction can be gained within the color gamut of the sRGB standard. When the data is to be outputted on silver halide photographic paper, processing is provided in such a way that the optimum color reproduction can be gained within the color gamut of silver halide photographic paper. In addition to compression of the above-mentioned color gamut, compression of gradation from 16 to 8 bits, reduction in the number of output pixels, and processing in response to the output characteristics (LUT) of the output device are also included. Further, it goes without saying that such processing as noise control, sharpening, white balance adjustment, color saturation adjustment or dodging is carried out.

"Medium" is defined as a storage medium used to store "output-referred image data" and "differential data". It can be any one of the compact flash (registered trademark), memory stick, smart media, multi-media card, hard disk, floppy (registered trademark) disk, magnetic storage medium (MO) and CD-R. The unit for writing on the storage medium can be integral with the image-capturing apparatus, a wired write unit connected via a cord, or a wireless unit installed independently or at a remote site connected through a communications line or via the Internet. It is also possible to provide such a function that, when the image-capturing apparatus is connected with the write unit for writing on the storage medium, "synthesizing-auxiliary data" and "required data" are read directly from the image processing apparatus or image recording apparatus. When "stored into a storage medium", it is preferred that the standardized general-purpose file format such as TIFF, JPEG and Exif—not the format inherent to the image-capturing apparatus—be used.

(21) An image-processing apparatus, characterized in that, the image-processing apparatus is provided with:

an inputting means for inputting output-referred image data generated by an image-capturing apparatus having at least two kinds of image sensors, sensitivities of which are different form each other, differential data attached to the output-referred image data, and synthesizing-information data for decomposing scene-referred image data, which are generated from the output-referred image data and the differential data, into scene-referred raw data sets;

a scene-referred image data generating means for generating synthesized and standardized scene-referred image data from the output-referred image data and the differential data inputted in the above;

a scene-referred raw data generating means for generating the plurality of scene-referred raw data sets, by decomposing the scene-referred image data, based on the synthesizing-information data; and an output-referred image data generating means for generating new output-referred image data by applying an image-processing, for optimizing a visual image formed on an output medium, to the scene-referred image data generated in the above.

According to the image-processing apparatus described in item 20, the synthesized scene-referred image data set of a standardized form is generated from the output-referred image data and differential data inputted from the image-capturing apparatus equipped with a plurality of image sensors of different sensitivities. This scene-referred image data is decomposed based on the inputted synthesizing information data, and the decomposed scene-referred raw data is subjected to optimization processing, thereby generating new output-referred image data. This arrangement allows easy editing and processing of the image data of wide dynamic range outputted from the image-capturing apparatus, and hence such data can be used for printing in general households and workplaces.

"Inputting" in the sense in which it is used here refers to transfer of the "output-referred image data", "differential data" and "synthesizing information data" outputted from the image-capturing apparatus, from the image-capturing apparatus to the image processing apparatus of the present invention through the medium storing them.

For example, when a image-capturing apparatus is connected with the above-mentioned unit for writing into the storage medium, and the image processing apparatus has also a function of reading the "output-referred image data", "differential data" and "synthesizing-auxiliary data" directly from the image-capturing apparatus, then the image processing apparatus of the present invention has means for connection with the image-capturing apparatus, and this connection means corresponds to the input section of the present invention. Further, when a portable "medium" such as a compact flash (registered trademark), memory stick, smart media, multi-media card, floppy (registered trademark) disk, photomagnetic storage medium (MO) or CD-R is used, then the image processing apparatus of the present invention has corresponding reading means, and this reading means corresponds to the input section of the present invention. Further, when the write unit is installed in a wireless state independently or at a remote site connected through a communications line or via the Internet, then the image processing apparatus of the present invention has communication means for connection with a communications line or the Internet, and this communications means corresponds to the input section of the present invention.

(22) An image-capturing apparatus, characterized in that, in the image-capturing apparatus having at least two kinds of image sensors, sensitivities of which are different form each other, there are provided:

a scene-referred raw data generating means for generating scene-referred raw data for each of the image sensors by photographing;

a scene-referred image data generating means for generating synthesized and standardized scene-referred image data from at least two scene-referred raw data sets generated in the above;

a synthesizing-information data generating means for generating synthesizing-information data for decomposing the scene-referred image data into the scene-referred raw data sets;

an output-referred image data generating means for generating output-referred image data by applying an image-processing, for optimizing a visual image formed on an output medium, to the scene-referred image data generated in the above;

a differential data generating means for generating differential data between the scene-referred image data generated in the above and the output-referred image data generated in the above; and a record-controlling means for attaching the synthesizing-information data, the differential data and image-capturing information data with respect to image-capturing conditions to the output-referred image data, and further, storing them into media.

According to the image-capturing apparatus described in item 22, the scene-referred raw data for each type of the image sensors, the sensitivities of which are different with respect to each other, is generated by photographing, and a synthesized scene-referred image data set of a standardized form is generated from at least two generated scene-referred raw data sets. At the same time, the synthesizing information data for decomposing the generated scene-referred image data to the scene-referred raw data is produced, and image processing of optimization to as to form the output-referred image on the output medium such as a camera monitor is applied to the generated scene-referred image data. Then output-referred image data is produced, and the differential data between the generated scene-referred image data and generated output-referred image data is generated. Then the differential data, synthesizing information data, photographic information data for photographing conditions are attached to the output-referred image data, and are recorded on the medium.

Thus, a wide dynamic range image without information loss can be recorded by generating the scene-referred raw data as direct raw output data of the image sensor that records the faithful information on a subject, for each of the image sensors, the sensitivities of which are different with respect to each other. Further, a quick display of the photographed image is enabled by the generation of the output-referred image data optimized for viewing on the output medium through generation of standardized scene-referred image data synthesized from the scene-referred raw data. Further, the system records the information on whether each pixel of the scene-referred image data is derived from low-sensitivity or high-sensitivity device and obtains the difference between the scene-referred image data and output-referred image data. Such information is recorded in the form associated with the output-referred image data. This makes it possible to retain information at the time of photographing. Further, the photographic information data can be outputted. This arrangement allows the output-referred image data to be produced in conformity to the photographing conditions when an image is created again from the output-referred image data in an external apparatus.

The "image-capturing data" (also referred to as "image-capturing information data") described in the present invention is a record representing photographing conditions at a time of photographing. It may contain the same as the tag information written into the header of the Exif file. To put it more specifically, it denotes the tag (code) representing the exposure time, shutter speed, f-stop number (F number), ISO sensitivity, brightness value, subject distance range, light source, on/off status of a stroboscopic lamp, subject area, white balance, zoom scaling factor, subject configuration, photographing scene type, the amount of reflected light of the stroboscopic lamp source and color saturation for photographing.

The above-mentioned "image-capturing data" can be divided into (1) the value captured at a time of photographing by a sensor mounted on the camera for automating the exposure setting and focusing functions of the image-capturing apparatus, (2) the data obtained by processing the value captured by the sensor, and (3) photographing conditions of the camera set on the basis of the value captured by the sensor. In addition to these, it also includes the information manually set by a user on the photographing mode dial (e.g. portrait, sports and macro photographing mode) and the setting switch for forced lighting of a stroboscopic lamp.

The "photographic information data" can be stored independently in the medium. It is particular preferred that it be recorded in the image file in the form of tag information to be written in the header. When the aforementioned "photographic information data" is stored in the medium independently of the "scene-referred raw data", information for associating between the two must be assigned to either or both of the "photographic information data" and "scene-referred raw data", or a separate status information file describing the association between the two must be provided.

(23) An image-processing apparatus, characterized in that, the image-processing apparatus is provided with:

an inputting means for inputting output-referred image data generated by an image-capturing apparatus having at least two kinds of image sensors, sensitivities of which are different form each other, differential data attached to the output-referred image data, synthesizing-information data for decomposing scene-referred image data, which are generated from the output-referred image data and the differential data, into scene-referred raw data sets, and image-capturing information data with respect to image-capturing conditions;

a scene-referred image data generating means for generating synthesized and standardized scene-referred image data from the output-referred image data and the differential data inputted in the above;

a scene-referred raw data generating means for generating the plurality of scene-referred raw data sets, by decomposing the scene-referred image data, based on the synthesizing-information data; and an output-referred image data generating means for generating new output-referred image data by employing the image-capturing information data and applying an image-processing, for optimizing a visual image formed on an output medium, to the scene-referred image data generated in the above.

The synthesized scene-referred image data set of a standardized form generated from the output-referred image data and differential data inputted from the image-capturing apparatus equipped with a plurality of image sensors having differential data. Further, this scene-referred image data is decomposed based on the inputted synthesizing information data and processing of optimization is applied to the decomposed scene-referred raw data using the inputted photographic information data, thereby generating new output-referred image data. This arrangement allows easy editing and processing of the image data of wide dynamic range outputted from the image-capturing apparatus, and hence such data can be used for printing in general households and workplaces.

The following shows an example of optimizing the output-referred image data using the "image-capturing information data":

"Subject configuration" information, included in the image-capturing information data, allows color saturation enhancement processing to be partially carried out, and permits dodging to be carried out for the scene containing an extensive dynamic range. "Photographing scene type" information, included in the image-capturing information data, allows special adjustment of color balance to be made by reducing the degree of white balance adjustment is loosened, in photographing of a night view, for example. The distance between the photographer and subject can be estimated from the information in the "amount of reflected light from a stroboscopic light source". The result can be effectively utilized in setting the conditions for image processing in order to reduce the white skipping of the skin of the subject, for example. The information on "subject type", included in the image-capturing information data, allows the degree of sharpness to be reduced and processing of smoothening to be enhanced in a portrait photograph, for example, thereby making the wrinkles on the skin less conspicuous.

In order to compensate for information on "subject configuration", "photographing scene type", "amount of reflected light from a stroboscopic light source" and "subject type", it is possible to use information on "exposure time", "shutter speed", "f-stop number (F number)", "ISO sensitivity", "brightness value", "subject distance range", "light source", "on/off status of a stroboscopic lamp", "subject area", "white balance", "zoom scaling factor", etc. for supplementary purpose. Further, the amount of noise control processing can be adjusted based on the "ISO sensitivity" information, and the "light source" information can be used for readjustment of white balance.

(24) An image-recording apparatus, characterized in that, the image-recording apparatus is provided with:

an inputting means for inputting output-referred image data generated by an image-capturing apparatus having at least two kinds of image sensors, sensitivities of which are different form each other, differential data attached to the output-referred image data, and synthesizing-information data for decomposing scene-referred image data, which are generated from the output-referred image data and the differential data, into scene-referred raw data sets;

a scene-referred image data generating means for generating synthesized and standardized scene-referred image data from the output-referred image data and the differential data inputted in the above;

a scene-referred raw data generating means for generating the plurality of scene-referred raw data sets, by decomposing the scene-referred image data, based on the synthesizing-information data; and an output-referred image data generating means for generating new output-referred image data by applying an image-processing, for optimizing a visual image formed on an output medium, to the scene-referred image data generated in the above; and an image-forming means for forming an visual image on an output medium by using the new output-referred image data generated in the above.

According to the image-recording apparatus described in item 24, the synthesized scene-referred image data set of a standardized form is generated from the output-referred image data and differential data inputted from the image-capturing apparatus equipped with a plurality of image sensors having differential data. Further, this scene-referred image data is decomposed based on the inputted synthesizing information data and processing of optimization is applied to the decomposed scene-referred raw data, thereby generating new output-referred image data. An output-referred image is formed on the output medium using the generated output-referred image data. This arrangement allows easy editing and processing of the image data of wide dynamic range outputted from the image-capturing apparatus described in claim 1, and makes it possible to provide the services of offering the optimized output-referred image data and prints without losing the image information obtained from photographing, in the same way as the services based on the conventional digital Mini-lab.

(25) An image-recording apparatus, characterized in that, the image-recording apparatus is provided with:

an inputting means for inputting output-referred image data generated by an image-capturing apparatus having at least two kinds of image sensors, sensitivities of which are different form each other, differential data attached to the output-referred image data, synthesizing-information data for decomposing scene-referred image data, which are generated from the output-referred image data and the differential data, into scene-referred raw data sets, and image-capturing information data with respect to image-capturing conditions;

a scene-referred image data generating means for generating synthesized and standardized scene-referred image data from the output-referred image data and the differential data inputted in the above;

a scene-referred raw data generating means for generating the plurality of scene-referred raw data sets, by decomposing the scene-referred image data, based on the synthesizing-information data; and an output-referred image data generating means for generating new output-referred image data by employing the image-capturing information data and applying an image-processing, for optimizing a visual image formed on an output medium, to the scene-referred image data generated in the above; and an image-forming means for forming an visual image on an output medium by using the new output-referred image data generated in the above.

According to the image-recording apparatus described in item 25, the synthesized scene-referred image data set of a standardized form is generated from the output-referred image data and differential data inputted from the image-capturing apparatus equipped with a plurality of image sensors having differential data. Further, this scene-referred image data is decomposed based on the inputted synthesizing information data and processing of optimization is applied to the decomposed scene-referred raw data using the inputted photographic information data, thereby generating new output-referred image data. This arrangement allows easy editing and processing of the image data of wide dynamic range outputted from the image-capturing apparatus, and makes it possible to provide the services of offering the optimized output-referred image data and prints without losing the image information obtained from photographing, in the same way as the services based on the conventional digital Minilab.

The image recording apparatus of the present invention can be equipped with a film scanner for inputting the frame image information of the photosensitive material recorded by an analog camera including a color film, color reversal film, black-and-white negative and black-and-white reversal film, or a flat head scanner for inputting the image information reproduced on color paper as silver halide photographic paper, in addition to the mechanism of applying image processing of the present invention to the digital image data obtained by the image-capturing apparatus of the present invention. It can be equipped with means for reading digital image data obtained by a digital camera other than the image-capturing apparatus of the present invention and stored in the known portable "medium" including a compact flash (registered trademark), memory stick, smart media, multi-media card, floppy (registered trademark) disk, photomagnetic storage medium (MO) or CD-R. Alternatively, it can be equipped with processing means for forming an output-referred image on a display device such as a CRT, liquid crystal display and plasma display, and a storage medium of any known type including silver halide photographic paper, inkjet paper and thermal printing paper, by obtaining digital image data from a remote place through communications means such as the Internet.

(26) The image-capturing apparatus, described in item 20 or 22, characterized in that, the image-capturing apparatus is provided with two kinds of image sensors, which are a high-sensitive image sensor and a low-sensitive image sensor; and the scene-referred raw data generating means generates a high-sensitivity scene-referred raw data from the high-sensitive image sensor and the low-sensitivity scene-referred raw data from the low-sensitive image sensor, through the image-capturing operation.

(27) The image-capturing apparatus, described in item 26, characterized in that, the high-sensitivity scene-referred raw data represent a monochrome image, on which only luminance information of the subject are recorded by photographing, while the low-sensitivity scene-referred raw data represent a color image.

(28) The image-capturing apparatus, described in item 26 or 27, characterized in that, centers of geometric shapes of the high-sensitive image sensor and the low-sensitive image sensor are arranged like a honeycomb pattern by shifting ½ of a pitch between the centers of geometric shapes of the image sensors relative to each other in a line (horizontal) direction and/or a column (vertical) direction.

According to the image-capturing apparatus described in items 26-28, an image data of wide dynamic range can be obtained by photographing.

(29) The image-capturing apparatus, described in anyone of items 20, 22, 26, 27 and 28 characterized in that, the scene-referred image data generating means generates the synthesized and standardized scene-referred image data by applying a correction processing of image sensor characteristics to the at least two of the scene-referred raw data sets, among the scene-referred raw data sets, each of which is generated for each kind of the image sensors, and synthesizing them; and the scene-referred image data generating means is provided with an instruction inputting means for instructing/inputting contents of the correction processing of the image sensor characteristics to be applied to the scene-referred raw data sets.

According to the image-capturing apparatus described in item 29, an instruction input section, serving as the instruction inputting means, for inputting the instruction for correction processing of image sensor characteristics to be applied to the scene-referred raw data is provided. This arrangement allows the user to select the contents of the correction processing of image sensor characteristics applied to each of the scene-referred raw data for each sensitivity level and to make a separate adjustment of parameters.

(30) The image-processing apparatus, described in item 21 or 23, characterized in that, the scene-referred raw data sets are two of high-sensitivity scene-referred raw data generated by the high-sensitive image sensor and the low-sensitivity scene-referred raw data generated by the low-sensitive image sensor.

(31) The image-processing apparatus, described in item 30, characterized in that, the high-sensitivity scene-referred raw data set represents a monochrome image, which includes only luminance information of a captured image, while the low-sensitivity scene-referred raw data set represents a color image.

According to the image-processing apparatus described in items 30 and 31, an image data of wide dynamic range can be obtained by photographing.

(32) The image-processing apparatus, described in anyone of items 21, 23, 30 and 31, characterized in that, the output-referred image data generating means generates the new output-referred image data by applying a correction processing of image sensor characteristics to the scene-referred raw data sets, and synthesizing them, and further, by applying an image-processing for optimizing the visual image formed on the outputting medium; and the output-referred image data generating means is provided with an instruction inputting means for instructing/inputting contents of the correction processing of the image sensor characteristics to be applied to the scene-referred raw data sets.

According to the image-processing apparatus described in item 32, the output-referred image data generating means is provided with an instruction inputting means for instructing/inputting contents of the correction processing of the image sensor characteristics to be applied to the scene-referred raw data sets. Accordingly, it becomes possible for the user by himself to conduct an operation for selecting contents of the correction processing of the image sensor characteristics to be applied to each of the scene-referred raw data sets and an operation for adjusting an individual parameter.

(33) The image-recording apparatus, described in item 24 or 25, characterized in that, the scene-referred raw data sets are two of high-sensitivity scene-referred raw data generated by the high-sensitive image sensor and the low-sensitivity scene-referred raw data generated by the low-sensitive image sensor.

(34) The image-recording apparatus, described in item 33, characterized in that, the high-sensitivity scene-referred raw data set represents a monochrome image, which includes only luminance information of a captured image, while the low-sensitivity scene-referred raw data set represents a color image.

According to the image-recording apparatus described in items 33 and 34, an image data of wide dynamic range can be obtained by photographing.

(35) The image-recording apparatus, described in anyone of items 24, 25, 33 and 34, characterized in that, the output-referred image data generating means generates the new output-referred image data by applying a correction processing of image sensor characteristics to the scene-referred raw data sets, and synthesizing them, and further, by applying an image-processing for optimizing the visual image formed on the outputting medium; and the output-referred image data generating means is provided with an instruction inputting means for instructing/inputting contents of the correction processing of the image sensor characteristics to be applied to the scene-referred raw data sets.

According to the image-recording apparatus described in item 35, the output-referred image data generating means is provided with an instruction inputting means for instructing/inputting contents of the correction processing of the image sensor characteristics to be applied to the scene-referred raw data sets. Accordingly, it becomes possible for the user by himself to conduct an operation for selecting contents of the correction processing of the image sensor characteristics to be applied to each of the scene-referred raw data sets and an operation for adjusting an individual parameter.

(36) The image-capturing apparatus, described in anyone of items 20, 22, and 26-29, characterized in that, a color space of the scene-referred image data is anyone of scRGB, RIMM RGB, ERIMM RGB, and sRGB, ROMM RGB are included in a color space of the output-referred image data.

(37) The image-processing apparatus, described in anyone of items 21, 23, and 30-32, characterized in that, a color space of the scene-referred image data is anyone of scRGB, RIMM RGB, ERIMM RGB, and sRGB, ROMM RGB are included in a color space of the output-referred image data.

(38) The image-recording apparatus, described in anyone of items 24, 25, and 33-35, characterized in that, a color space of the scene-referred image data is anyone of scRGB, RIMM RGB, ERIMM RGB, and sRGB, ROMM RGB are included in a color space of the output-referred image data.

According to the image-capturing apparatus, the image-processing apparatus and the image-recording apparatus described in items 36-38, Since each of the scene-referred image data and the output-referred image data is categorized in a standard color space, it becomes possible to utilize them for general-purpose.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
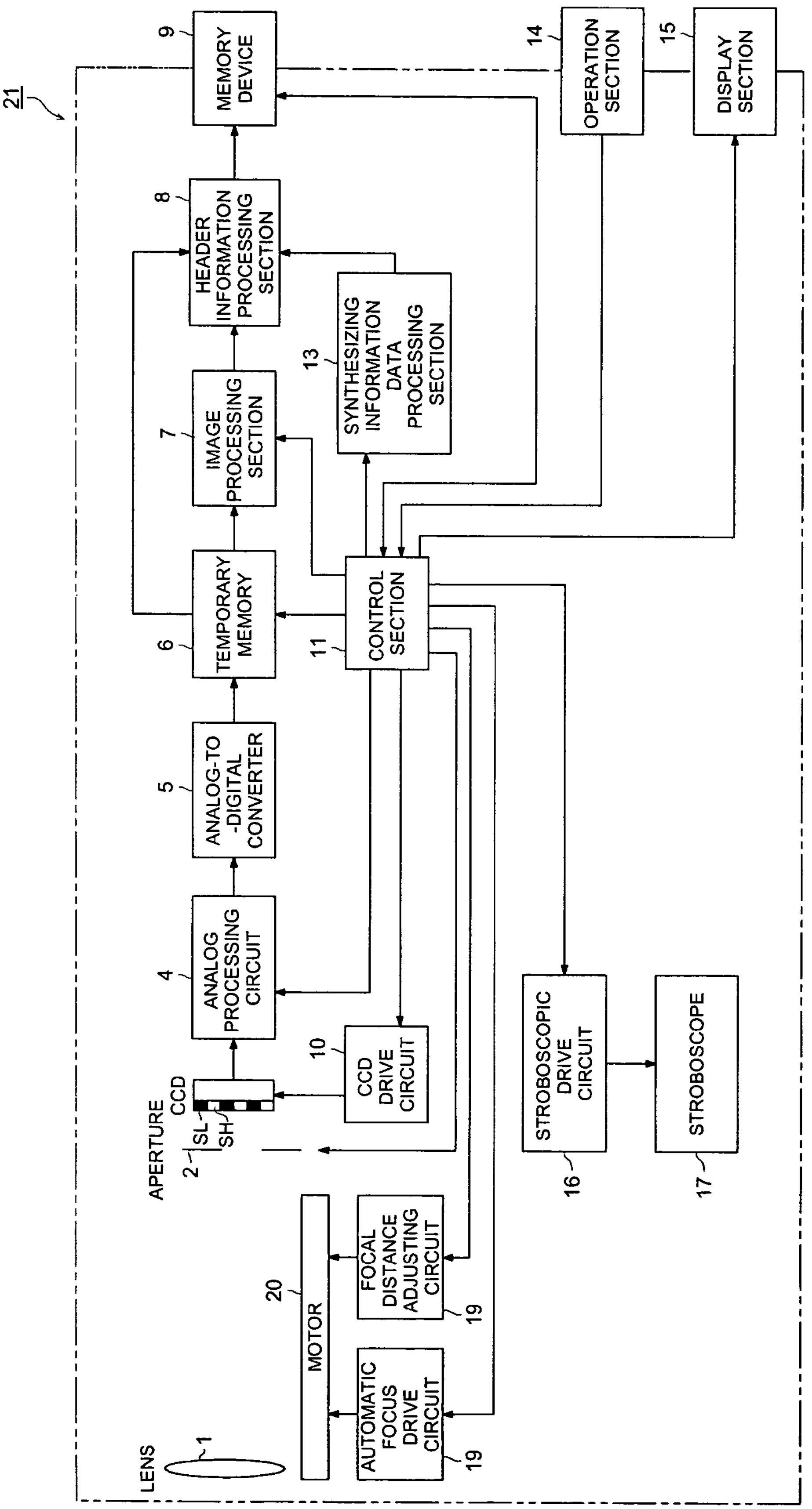
FIG. 1 is a block diagram representing the functional configuration of an image-capturing apparatus embodied in the present invention.

Referring to the drawing, the following describes the preferred embodiments of the image-capturing apparatus of the present invention:

<Configuration of Image-Capturing Apparatus 21>

The configuration will be described first:

FIG. 1 is a block diagram representing the functional configuration of an image-capturing apparatus 21 of the present invention. As shown in FIG. 1, the image-capturing apparatus 21 is a lens 1, aperture 2, CCD 3 (Charge Coupled Device) consisting of a low-sensitivity image sensor SL and high-sensitivity image sensor SH, analog processing circuit 4, analog-to-digital converter 5, temporary memory 6, image processing section 7, header information processing section 8, memory device 9, CCD drive circuit 10, control section 11, image-capturing characteristic compensation information processing section 13, operation section 14, display section 15, stroboscopic drive circuit 16, stroboscope 17, focal distance adjusting circuit 18, automatic focus drive circuit 19, motor 20, etc.

The optical system of the image-capturing apparatus 21 contains a lens 1, aperture 2 and CCD 3.

The lens 1 forms an optical image of a subject by adjusting the focus. The aperture 2 adjusts the amount of the bundle of light passing through the lens 1.

The CCD 3 has two types of image sensors; a low-sensitivity image sensor SL and high-sensitivity image sensor SH. The CCD 3 provides photoelectric conversion of the subject information formed on the light receiving surface by the lens 1, into the electric signal (image-capturing signal) in the amount corresponding to the amount of incoming light of each sensor in the CCD 3. Being controlled by the timing pulse outputted from the CCD drive circuit 10, the CCD 3 sequentially outputs the photographic signal of low-sensitivity image sensor SL and high-sensitivity image sensor SH to the analog processing circuit 4.

Figure 2:
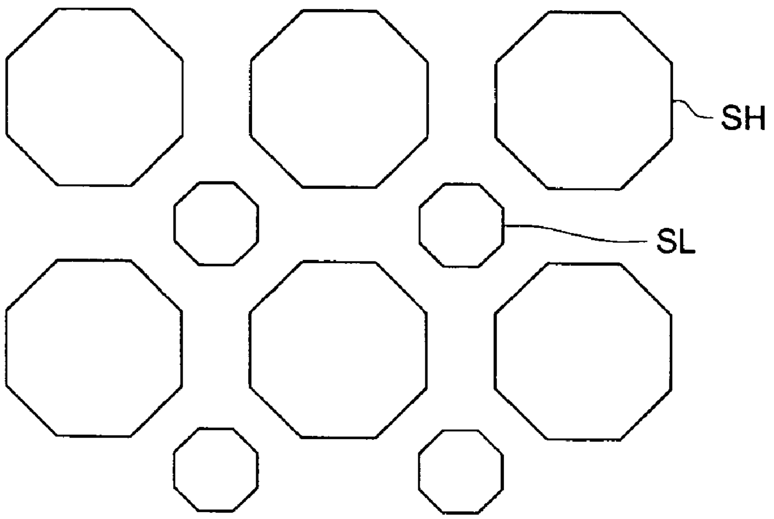
FIG. 2 is a schematic diagram showing an example of the layout of a low-sensitivity image sensor SL and high-sensitivity image sensor SH of a CCD shown in FIG. 1.

FIG. 2 shows an example of the layout of a low-sensitivity image sensor SL and high-sensitivity image sensor SH of the CCD 3. As shown in FIG. 2, the low-sensitivity image sensors SL and high-sensitivity image sensors SH are arranged in a honeycomb figure in positions displaced, in the direction of vertical column and/or and horizontal row with respect to each other in terms of the centers of the geometrical profile of the image sensor, by half the pitch representing the interval between image sensors, namely, by ½ pitch. The high-sensitivity image sensor SH has a greater light receiving area than the low-sensitivity image sensor SL. The high-sensitivity image sensor SH is a monochrome device, without any color sensitivity (color difference sensitivity), responding only to the brightness of the subject, whereas the low-sensitivity image sensor SL is composed of a color device having the color sensitivity (color difference sensitivity) of each of B, G and R.

Figure 3:
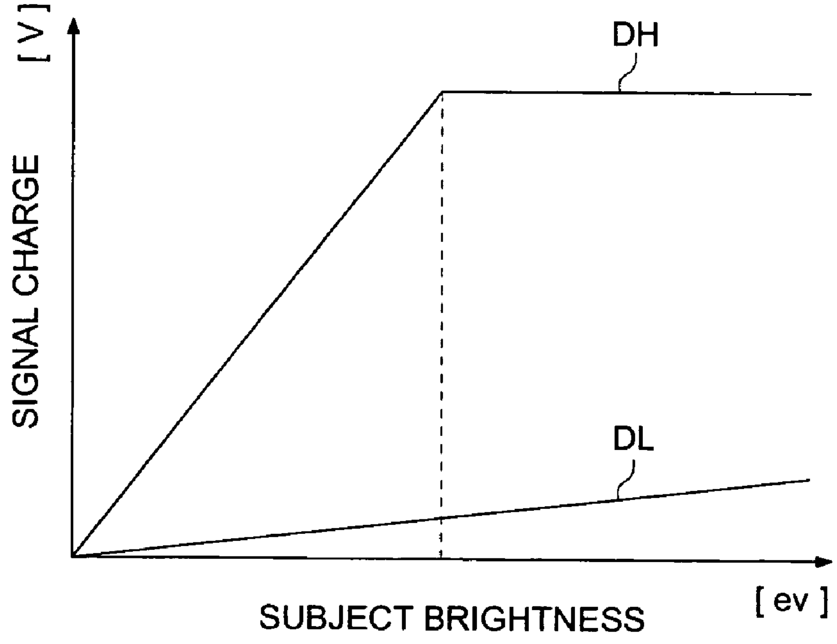
FIG. 3 is a graph representing the relationship DL between subject brightness and signal charge in the low-sensitivity image sensor SL shown in FIG. 1, and the relationship DH between subject brightness and signal charge in the high-sensitivity image sensor SH shown in FIG. 1.

FIG. 3 shows the relationship DL between subject brightness and signal charge in the low-sensitivity image sensor SL of FIG. 1, and the relationship DH between subject brightness and signal charge in the high-sensitivity image sensor SL. As shown in FIG. 3, an image sensor having a higher sensitivity can respond to a darker subject, but the dynamic range tends to be insufficient for a brighter subject. The signal tends to get saturated. In the case of an image sensor of lower sensitivity, on the other hand, the signal is not easily saturated with respect to a brighter subject, and the image sensor of lower sensitivity can respond thereto. However, the sensitivity is insufficient for a darker subject, and the image sensor of lower sensitivity is more susceptible to noise. Thus, the CCD 3 is composed of two types of image sensors—a high-sensitivity image sensor SH and a low-sensitivity image sensor SL to ensure an expanded dynamic range. To expand the dynamic range, it is preferred to minimize the overlap between respective dynamic ranges.

The analog processing circuit 4 applies processing of amplifying R, G and B signals and reducing noise, to the image-capturing signal from the low-sensitivity image sensor SL and high-sensitivity image sensor SH inputted from the CCD 3.

The analog-to-digital converter 5 converts the image-capturing signal from the low-sensitivity image sensor SL and high-sensitivity image sensor SH inputted from the analog processing circuit 4, into the digital image data, and outputs it in the form of low-sensitivity scene-referred raw data and high-sensitivity scene-referred raw data.

The temporary memory 6 is a buffer memory and others, and temporarily stores the low-sensitivity scene-referred raw data and high-sensitivity scene-referred raw data outputted from the analog-to-digital converter 5.

The image processing section 7 as a scene-referred raw data generating section applies correction processing of image sensor characteristics to each of low-sensitivity scene-referred raw data and high-sensitivity scene-referred raw data, and synthesizes them to generate a synthesized scene-referred image data set of a standardized form. The correction processing of image sensor characteristics includes at least processing of mapping the signal intensity of each color channel to the standard color space such as the aforementioned scRGB, RIMM RGB and ERIMM RGB, where this signal intensity of each color channel is based on the spectral sensitivity inherent to the image sensor having generated the low-sensitivity scene-referred raw data and high-sensitivity scene-referred raw data. In addition to the above, computation of frequency processing such as gradation conversion, smoothing, sharpening, noise elimination and moiré elimination is carried out.

One of the methods of synthesizing the low-sensitivity scene-referred raw data and high-sensitivity scene-referred raw data is to compare between signal values of low-sensitivity scene-referred raw data and high-sensitivity scene-referred raw data are compared for each pixel at the same position, and to select one of the signal values. For example, a threshold value is assigned to the signal value of the low-sensitivity pixel. If the signal value has been reduced below the threshold value, the high-sensitivity pixel is selected. Signal values of low-sensitivity scene-referred raw data and high-sensitivity scene-referred raw data are blended (e.g. 40% low-sensitivity scene-referred raw data vs. 60% high-sensitivity scene-referred raw data), or the signal values are selected in the 3*3 pixel area and are blended, thereby synthesizing the data.

In the present embodiment, the low-sensitivity image sensor SL is a color device and the high-sensitivity image sensor SH is a monochrome device. The brightness values of the low-sensitivity scene-referred raw data and high-sensitivity scene-referred raw data are synthesized for each pixel at the same position (or area). To put it another way, the RGB signals of each pixel of the low-sensitivity scene-referred raw data is converted into brightness value L and color components a and b. Only the brightness value is synthesized with the brightness value L of the high-sensitivity scene-referred raw data, and the resultant value is assumed as L'. The generated L'ab is converted into RGB'.

Low-sensitivity RGB→Lab

Low-sensitivity L+high-sensitivity L→L'

L'ab→RGB'

The image processing section 7 as an output-referred image data generating section applies the processing of optimization for getting the optimum image at the display section 15, to the generated scene-referred image data, and generates the output-referred image data. At the same time, the image processing section 7 as a differential data generating section generates the differential data between the generated scene-referred image data and output-referred image data, and outputs them by associating them with each other. The processing of optimization includes compression to the color area suited for the display section 15 such as sRGB, ROMM RGB (Reference Output Medium RGB), gradation compression from 16 to 8 bits, reduction in the number of output pixels, and operations performed to conform to the output characteristics (LUT) of the display section 15, for example. It also includes such image processing as nose reduction, sharpness enhancement, color balancing, color saturation adjustment and dodging.

The header information processing section 8 applies the processing to the output-referred image data generated by the image processing section 7 wherein this processing consists of the step of writing the differential data and synthesizing information data generated by the synthesizing information data processing section 13, as head information.

The memory device 9 consists of a nonvolatile semiconductor memory, a recording medium such as a memory card for recording the output-referred image data generated by photographing, and a readable memory with the control program of the image-capturing apparatus 21 stored therein.

The CCD drive circuit 10 outputs the timing pulse based on the control signal outputted from the control section 11 and provides drive control of the CCD 3.

The control section 11 consists of a CPU (Central Processing Unit) and others, and reads out the control program of the image-capturing apparatus 21 stored in the memory device 9 and various processing programs. According to such programs, the control section 11 implements various types of processing including the processing of photographic recording to be described later. To put it another way, the control section 11 controls an automatic focus drive circuit 19 for controlling the motor 20 to adjust the focal distance and focus of the lens 1 in response to the operation signal from the operation section 14, focal distance adjusting circuit 18, CCD drive circuit 10, analog processing circuit 4 and stroboscopic drive circuit 16, thereby allowing photographing to be carried out. As a scene-referred image data generating section, the control section 11 generates low-sensitivity scene-referred raw data and high-sensitivity scene-referred raw data. It controls the image processing section 7, synthesizing information data processing section 13 and header information processing section 8, and generates the scene-referred image data from each of the scene-referred raw data sets. It then generates the output-referred image data from the generated scene-referred image data. As a record control section, the control section 11 attaches the differential data between the scene-referred image data and output-referred image data and synthesizing information data to the output-referred image data, and records them on the recording medium of the memory device 9.

The synthesizing information data processing section 13 provides a means for generating synthesizing information data. It records information of whether each pixel of the generated scene-referred image data is derived from the low-sensitivity image sensor SL or from high-sensitivity image sensor SH; namely, it records the information on whether each pixel is derived from the signal value of low-sensitivity scene-referred raw data or from that of high-sensitivity scene-referred raw data (information on the percentage of each of the high- and low-sensitivity values when these values are synthesized; and information for each pixel area if the signal values are synthesized by selection and blending of them for each pixel area), whereby the synthesizing information data is generated and is outputted to the header information processing section 8.

The operation section 14 is equipped with various functional buttons (not illustrated) such as a release button, power ON/OFF button and zoom button, and cursor. The operation signals corresponding to buttons and keys are outputted to the control section 11 as the input signals. Further, the operation section 14 has a touch panel covering the display screen of the display section 15. The X and Y coordinates of the power point on the display screen depressed by a finger or touch pen are detected in terms of voltage value and the signal of the detected position, and are outputted to the control section 11 as an operating signal.

Figure 4:
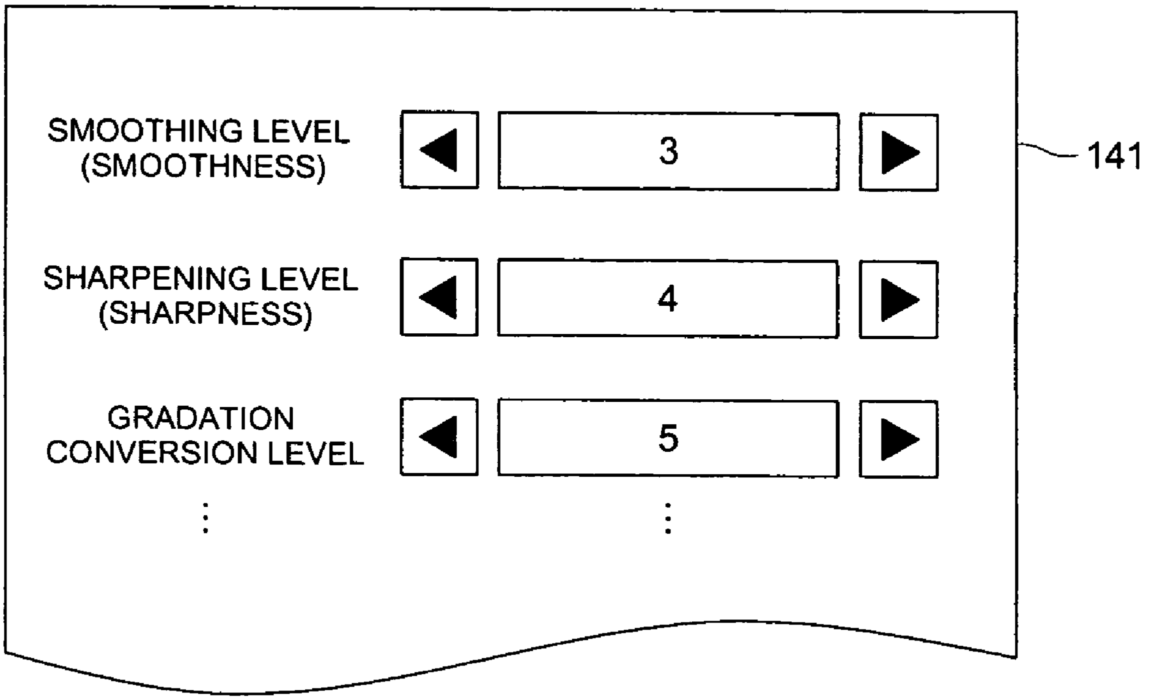
FIG. 4 is a drawing showing an example of an input screen 141 displayed on the display section 15 of FIG. 1.

FIG. 4 is a drawing showing an example of an input screen 141 for inputting the contents of image processing to be applied in the step of generating the scene-referred image data from the low- and high-sensitivity scene-referred raw data. As shown in FIG. 4, the input screen 141 provides a means for inputting instructions, and various levels of image processing such as “Smoothing level (smoothness), Sharpening level (sharpness), Gradation conversion level, . . . ” can be inputted through the touch panel. For example, when a user has inputted a higher degree of the smoothing level, processing of a higher degree of smoothing is applied to the component derived from the high-sensitivity image sensor.

The display section 15 is a monitor consisting of a CRT (cathode ray tube) and LCD (liquid crystal display). It displays the photographed digital image data, by the control signal from the control section 11 and exhibits the display screen so that the user of the image-capturing apparatus 21 can enter information, settings and conditions to verify the photographic settings and conditions. For example, the display section 15 displays the input screen for the user to specify the contents of the image processing to be applied to the low-sensitivity scene-referred raw data and high-sensitivity scene-referred raw data generated by photographing.

When the subject brightness is low, the stroboscopic drive circuit 16 provides drive control of the stroboscope 17 and causes it to light up, in response to the control signal from the control section 11.

The stroboscope 17 boosts the battery voltage to a predetermined high level, and stores it in the capacitor as an electric charge. Driven by the stroboscopic drive circuit 16, the stroboscope 17 causes the x-ray tube to light using the electric charge stored in the capacity, and applies auxiliary light to the subject.

In response to the control signal from the control section 11, the focal distance adjusting circuit 18 controls the motor 20 to move the lens 1 and adjust the focal distance.

In response to the control signal from the control section 11, the automatic focus drive circuit 19 controls the motor 20 to move the lens 1 and adjust the focus.

<Operation of Image-Capturing Apparatus 21>

Figure 5:
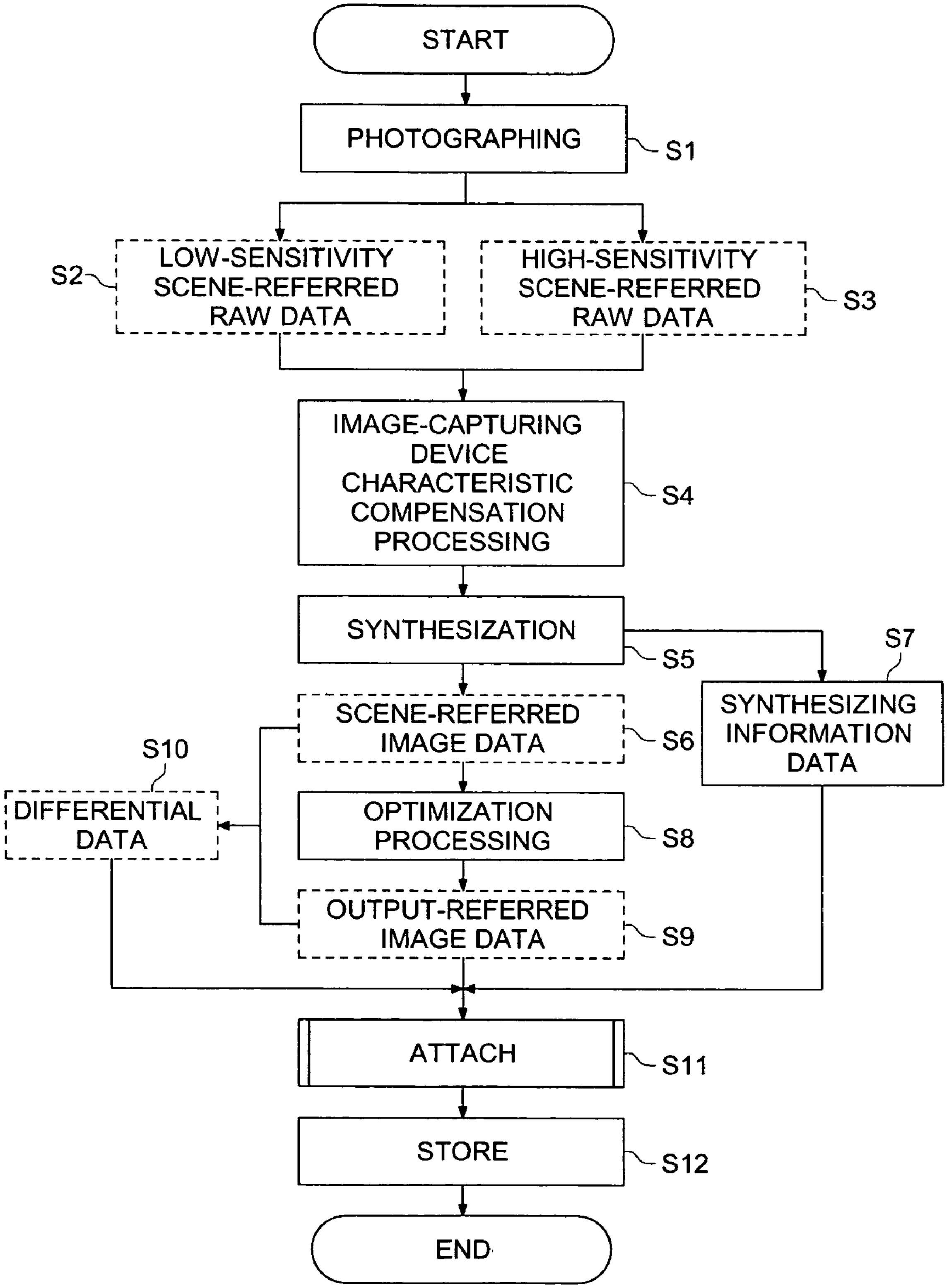
FIG. 5 is a flowchart showing the processing of photographing recording A to be implemented by the control section 11.

The following describes the operation:

FIG. 5 is a flowchart showing photographic recording processing A to be applied under the control of the control section 11 when the release switch is depressed by the operation section 14. Referring to FIG. 5, the following describes the photographic recording processing A:

When the release switch of the operation section 14 has been depressed, photographing is performed (Step S1). One photographing in Step S1 contains photographing by the auto blanket function. The photographing signals obtained from the low-sensitivity image sensor SL and high-sensitivity image sensor SH of the CCD 3 are each converted into the digital image data by the analog-to-digital converter 5, whereby the low-sensitivity scene-referred raw data and high-sensitivity scene-referred raw data are generated (Steps S2 and 3). Correction processing of image sensor characteristics is applied to the generated low-sensitivity scene-referred raw data and high-sensitivity scene-referred raw data, by the image processing section 7, and the color space is standardized (Step S4). The synthesized scene-referred image data set of a standardized form is generated (Step S6) by subsequent synthesization (Step S5). Further, information on whether each of the generated scene-referred raw data pixels is derived from the low-sensitivity image sensor SL or high-sensitivity image sensor SH is recorded by the synthesizing information data processing section 13, whereby the synthesizing information data is generated (Step S7).

Then the processing of optimization for getting the optimum image at the display section 15 is applied to the generated scene-referred image data (Step S8), and the output-referred image data is generated (Step S9). When the output-referred image data has been created, the optimized output-referred image data is subtracted from the scene-referred image data prior to optimization by the image processing section 7, whereby differential data is created (Step S10). Thus, a file of the generated output-referred image data is generated. The synthesizing information data and differential data as tag information are attached to the header of this file (Step S11), and are recorded and preserved in the recording medium of the memory device 9 installed removably on the image-capturing apparatus 21 (Step S12).

Figures 6, 7:
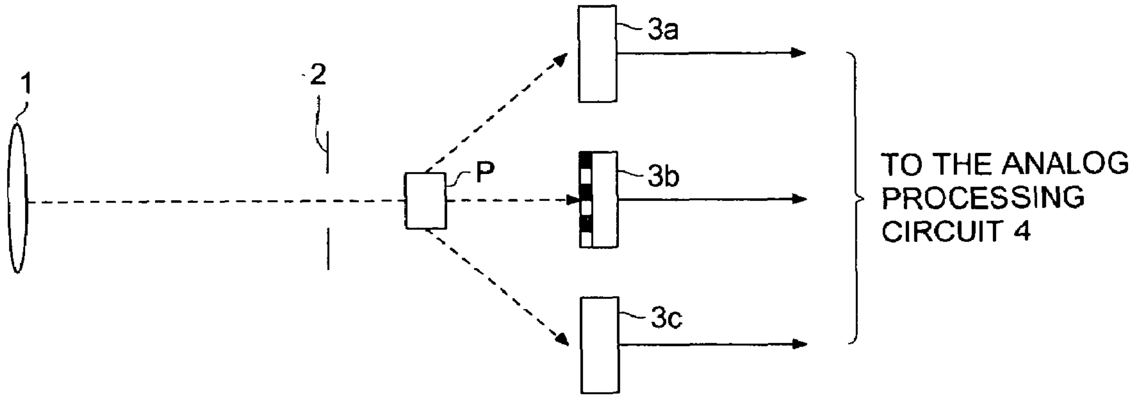
FIG. 6 is a drawing representing the digital image file recoded in the recording medium of the memory device 9 in Step S12 shown in FIG. 5.
FIG. 7 is a drawing showing an example of CCD 3 made of the 3CCDs having CCD 3*a* through CCD 3*c;*

FIG. 6 is a drawing representing the configuration of the digital image file data recoded in the recording medium of the memory device 9 in Step S12. As shown in FIG. 6, the differential data and synthesizing information data, obtained when the output-referred image data is generated from the output-referred image data and scene-referred image data, are recorded on the recording medium in the form associated with each other. By taking this recording medium from the image-capturing apparatus 21 and mounting it on the external apparatus such as the image processing apparatus and image recording apparatus, the information obtained by photographing can be outputted to the external apparatus with this information retained. It is also possible to output the photographing statuses such as photographing condition settings.

Attaching the differential data and synthesizing information data to the output-referred image data does not necessarily require the differential data and synthesizing information data themselves to be attached as a file header of the output-referred image data. It is sufficient if the output-referred image data and synthesizing information data are recorded on the recording medium as information for associating between the two. Here data is recorded on the recording device of the memory device 9, but it is also possible to provide the image-capturing apparatus 21 with a communications interface and to record the data on the media provided by a server or the like through the communications means such as communications cable and network.

As described above, in the image-capturing apparatus 21 shown in FIG. 1, the CCD 3 has image sensors having different sensitivities—the low-sensitivity image sensor SL and high-sensitivity image sensor SH, so the image of a wide dynamic range without loss of information can be recorded by generating the scene-referred raw data as a signal derived directly from the image sensor that records the faithful information on a subject, for each of the image sensors, the sensitivities of which are different with respect to each other. Further, means are provided to generate the output-referred image data optimized for viewing on the output medium of the display section 15 through generation of the synthesized scene-referred image data set of a standardized form gained by combining the scene-referred raw data sets. This arrangement makes it possible to display on the display section 15. Further, the system records the information on whether each pixel of the scene-referred image data is derived from low-sensitivity or high-sensitivity device and obtains the difference between the scene-referred image data and output-referred image data. Such information is recorded in the form associated with the output-referred image data. This makes it possible to retain information at the time of photographing.

In the image-capturing apparatus 21, the numbers of gradations of the scene-referred raw data generated by the low-sensitivity image sensor SL and high-sensitivity image sensor SH can be the same with each other, but it is preferred that the number of gradations of high-sensitivity image sensor SH be greater than that of the low-sensitivity image sensor SL. Further, as shown in FIG. 3, the response performance with respect to the subject brightness of the image sensor is preferred to be linear,) but can be different for each sensitivity level.

Further, the CCD 3 is provided with two types of image sensors; low-sensitivity image sensor and high-sensitivity image sensor. It is also possible to arrange such a configuration that an intermediate-sensitivity image sensor is provided.

As shown in FIG. 7, it is also possible to arrange such a configuration that the CCD 3 is composed of the CCD 3 consisting of CCD 3*a* through 3*c*, and the light of the subject passing through the lens 1 is decomposed into light of blue (B), green (G) and red (R) by a spectroscope P; thus, the CCD 3*a* is used to form an image and receive light for the signal B; the CCD 3*b* for signal G; and CCD 3*c* for signal G. In this case, at least one CCD, for example, the CCD 3*b* for receiving signal G having the highest rate of contribution in terms of brightness should be composed of the low-sensitivity image sensor SL and high-sensitivity image sensor SH. This arrangement makes it possible to generate scene-referred raw data characterized by high precision and excellent color reproducibility.

<Configuration of Image-Capturing Apparatus 22>

Figure 8:
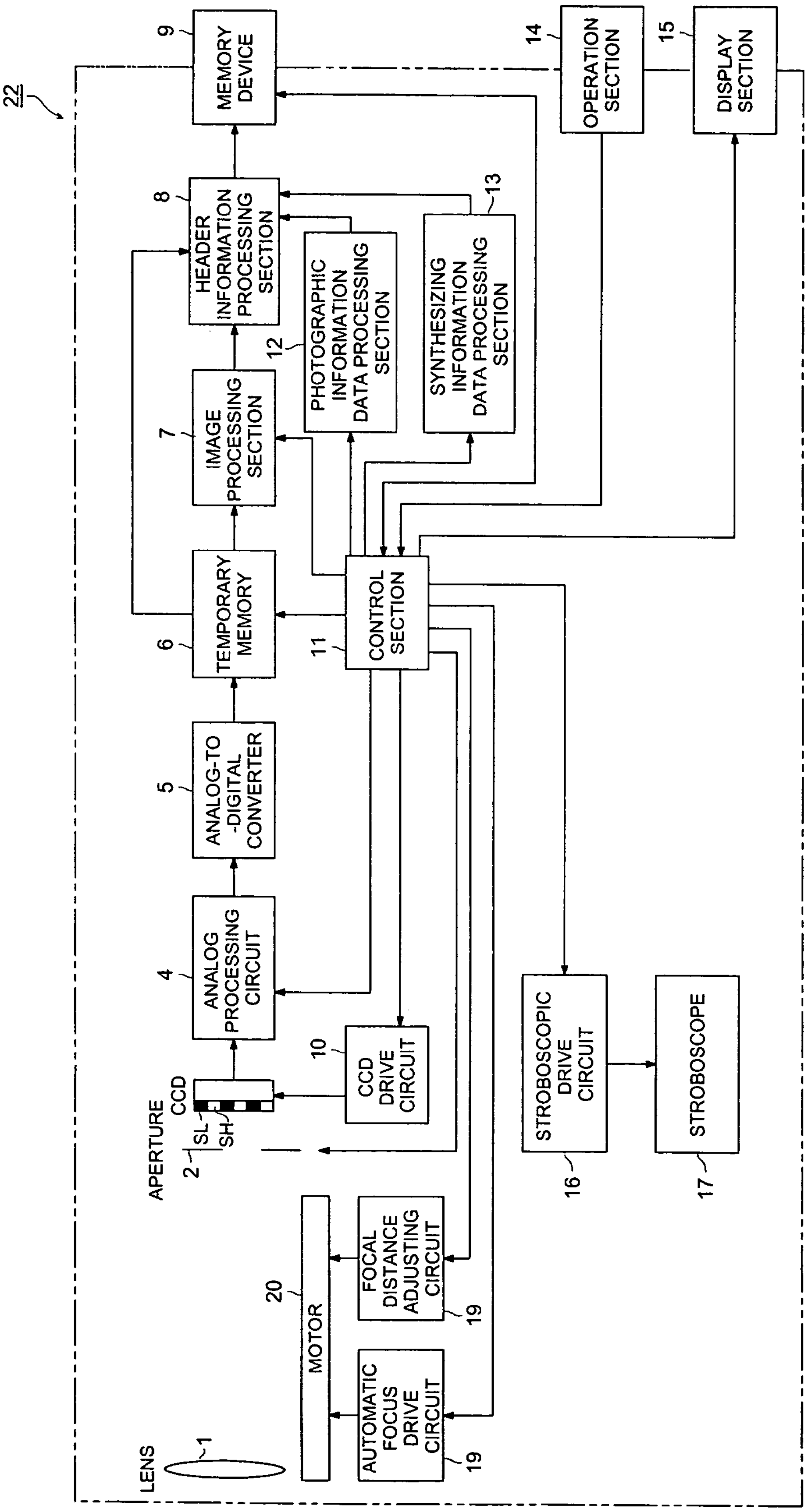
FIG. 8 is a block diagram representing the functional configuration of an image-capturing apparatus embodied in the present invention.

The following describes the image-capturing apparatus 22 formed by adding a photographic information data processing section 12 to the configuration of an image-capturing apparatus 21 in order to get the more preferable image on the output destination of the digital image data: FIG. 8 is a block diagram representing the functional configuration of an image-capturing apparatus 22.

The photographic information data processing section 12 generates photographic information data. The photographic information data includes the information directly related to the camera type (model) such as a camera name and code number, or the information on the settings of photographic conditions such as exposure time, shutter speed, f-stop number, ISO sensitivity, brightness, subject distance range, light source, use or disuse of a stroboscopic lamp, subject range, white balance, zoom range, subject configuration, type of the scene to be photographed, amount of reflected light of stroboscopic light source and color saturation in photographing, as well as the type of the subject.

The image-capturing apparatus 22 is configured in the same manner as the data buffer 221, and will not be described to avoid duplication.

<Operation of Image-Capturing Apparatus 22>

Figure 9:
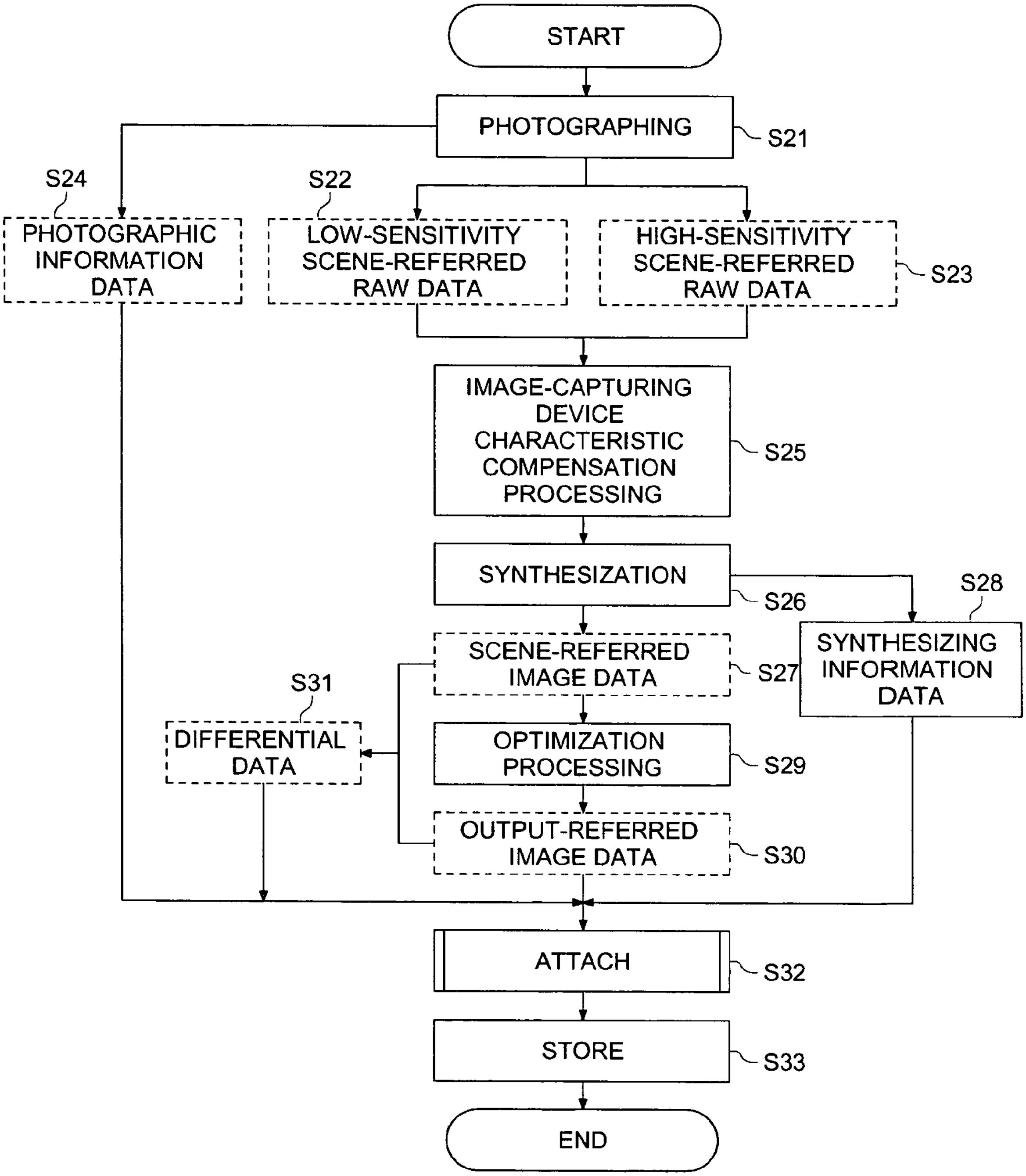
FIG. 9 is a flowchart showing the photographing/recording processing B applied under the control by the control section 11.

FIG. 9 describes the photographic recording processing B implemented under the control of the control section 11 when the release switch of the operation section 14 has been depressed in the image-capturing apparatus 22 shown in FIG. 8.

When the release switch of the operation section 14 has been depressed, photographing is performance (Step S21). One photographing in Step S21 contains photographing by the auto blanket function. The photographing signals obtained from the low-sensitivity image sensor SL and high-sensitivity image sensor SH of the CCD 3 are each converted into the digital image data by the analog-to-digital converter 5, whereby the low-sensitivity scene-referred raw data and high-sensitivity scene-referred raw data are generated (Steps S22 and 23). Photographic information data is generated by the photographic information data processing section 12 (Step S24).

Correction processing of image sensor characteristics is applied to the generated low-sensitivity scene-referred raw data and high-sensitivity scene-referred raw data, by the image processing section 7, and the color space is standardized (Step S25). The synthesized scene-referred image data set of a standardized form is generated (Step S27) by subsequent synthesization (Step S26). Further, information on whether each of the generated scene-referred raw data pixels is derived from the low-sensitivity image sensor SL or high-sensitivity image sensor SH is recorded by the synthesizing information data processing section 13, whereby the synthesizing information data is generated (Step S28).

Then the processing of optimization for getting the optimum image at the display section 15 is applied to the generated scene-referred image data (Step S29), and the output-referred image data is generated (Step S30). When the output-referred image data has been created, the optimized output-referred image data is subtracted from the scene-referred image data prior to optimization by the image processing section 7, whereby differential data is created (Step S31). Thus, a file of the generated output-referred image data is generated. The differential data, synthesizing information data and photographic information data as tag information are attached to the header of this file (Step S32), and are recorded and preserved in the recording medium of the memory device 9 installed removably on the image-capturing apparatus 21 (Step S33).

Figure 10:
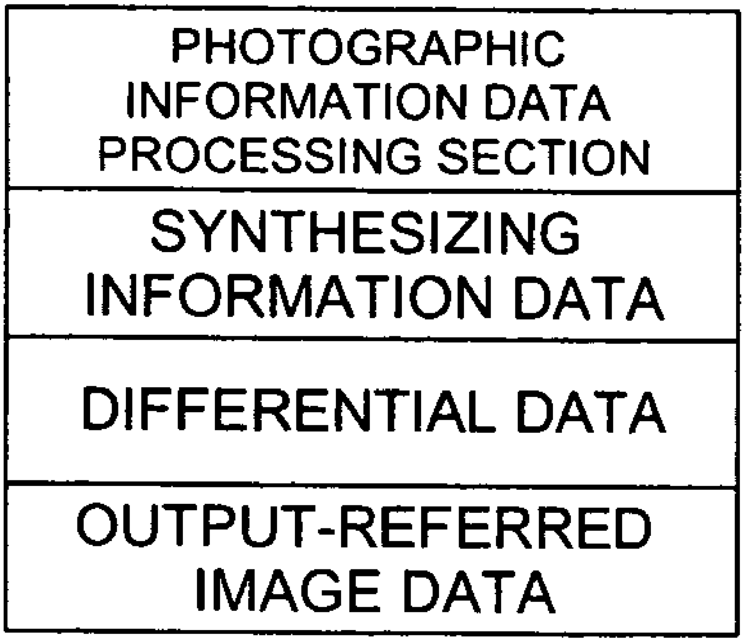
FIG. 10 is a drawing representing the data structure of the digital image file recorded on the recording medium of the memory device 9 in Step S33 shown in FIG. 9.

FIG. 10 is a drawing representing the configuration of the digital image file data recoded in the recording medium of the memory device 9 in Step S33. As shown in FIG. 10, the differential data, synthesizing information data and photographic information data, obtained when the output-referred image data is generated from the output-referred image data and scene-referred image data, are recorded on the recording medium in the form associated with each other. By taking this recording medium from the image-capturing apparatus 22 and mounting it on the external apparatus such as the image processing apparatus and image recording apparatus, the information obtained by photographing can be outputted to the external apparatus with this information retained. It is also possible to output the photographing statuses such as photographing condition settings.

Attaching the differential data, synthesizing information data and photographic information data to the output-referred image data does not necessarily require the differential data, synthesizing information data and photographic information data themselves to be attached as a file header of the output-referred image data and differential data. It is sufficient if the output-referred image data and synthesizing information data are recorded on the recording medium as information for associating between the two. Here data is recorded on the recording device of the memory device 9, but it is also possible to provide the image-capturing apparatus 22 with a communications interface and to record the data on the media provided by a server or the like through the communications means such as communications cable and network.

As described above, in addition to the advantages provided by the image-capturing apparatus 21 given in FIG. 1, the image-capturing apparatus 22 shown in FIG. 8 allows an external output apparatus to output the data that permits generation of the output-referred image data in response to the photographic status.

<Configuration of Image Processing Apparatus 115>

The following describes the embodiment of the image processing apparatus of the present invention:

The configuration will first be introduced.

Figure 11:
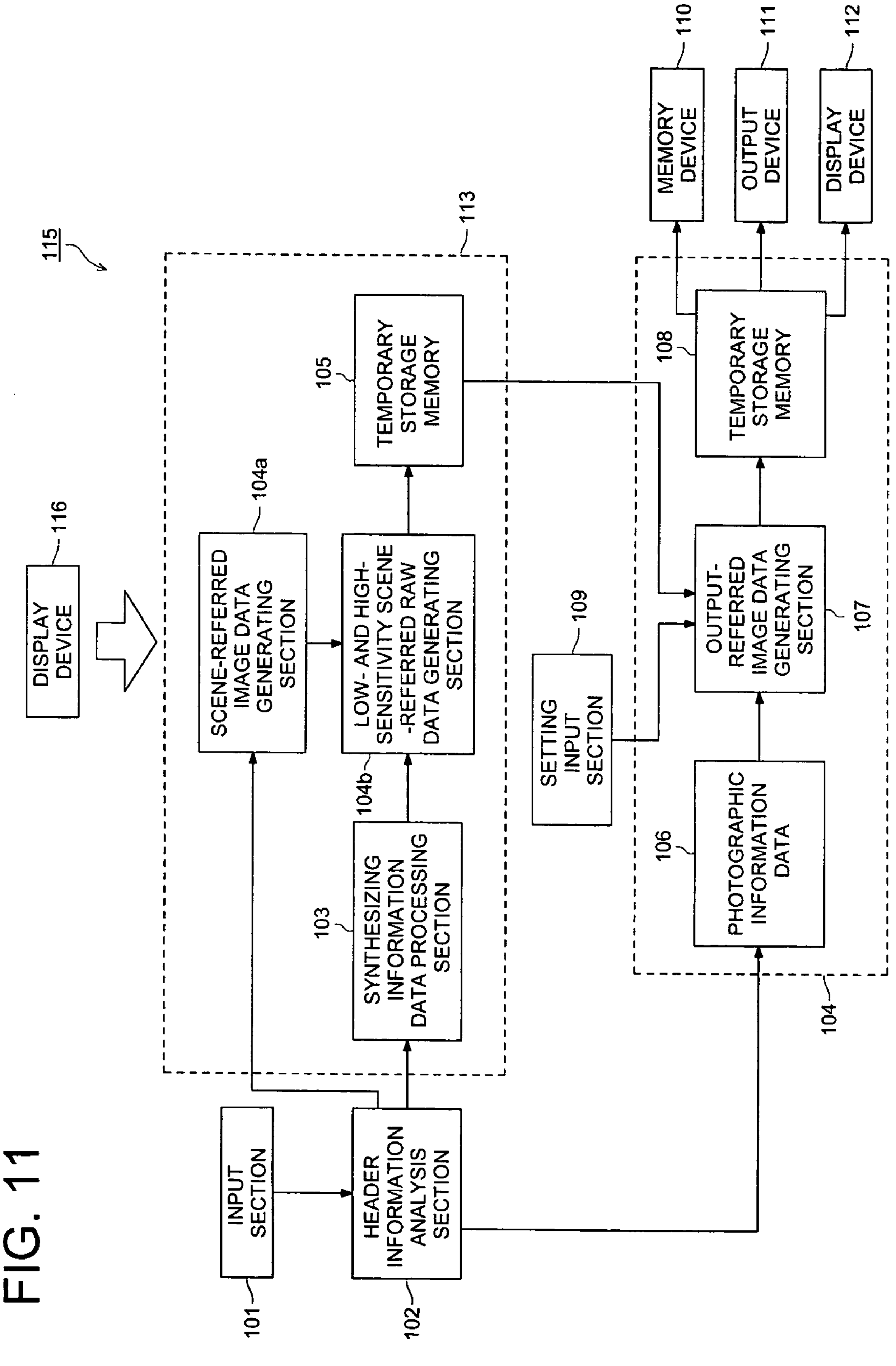
FIG. 11 is a block diagram representing the functional configuration of the image processing apparatus 115 of the present invention.

FIG. 11 is a block diagram representing the functional configuration of the image processing apparatus 115 of the present invention. As shown in FIG. 11, the image processing apparatus 115 consists of a first processing section 113 for generating scene-referred image data from the input section 101, header information analysis section 102, output-referred image data and differential data, and generating and decomposing the scene-referred image data into the low-sensitivity scene-referred raw data set and high-sensitivity scene-referred raw data, based on the synthesizing information data set; and a second processing section 114 for applying the processing of optimization to the low-sensitivity scene-referred raw data and high-sensitivity scene-referred raw data generated by the first processing section 113, and generating the output-referred image data.

The first processing section 113 and second processing section 114 are each connected with a header information analysis section 102. Further, the second processing section 114 is so arranged to permit connection with a memory device 110, output device 111 and display device 112. The following components operate under the administrative control of the of the control section 116 consisting of the CPU and others.

The input section 101 is equipped with a recording medium mounting section (not illustrated). When the recording medium containing a file (FIGS. 6 and 10) of the wide dynamic range image data recorded thereon by the aforementioned image-capturing apparatuses 21 and 22 is mounted on this mounting section, the input section 101 for providing an input means reads the recorded data file and outputs it to the header information analysis section 102. In the present embodiment, the input section 101 is described to read data from the mounted recording medium. However, it is also possible to arrange such a configuration that the data communications cable and radio or wired communications means are provided, and data is inputted through these means of communications.

The header information analysis section 102 analyzes the data inputted from the input section 101, and decomposes it into output-referred image data, differential data, synthesizing information data and photographic information data. It outputs the synthesizing information data to the synthesizing information data processing section 103, output-referred image data and differential data to the scene-referred image data generating section 104*a*, and photographic information data to the photographic information data 106.

As shown in FIG. 11, the first processing section 113 consists of a synthesizing information data processing section 103, scene-referred image data generating section 104*a* low- and high-sensitivity scene-referred raw data generating section 104*b* and temporary storage memory 105.

When the synthesizing information data is inputted from the header information analysis section 102, the synthesizing information data processing section 103 stores this synthesizing information data temporarily.

The scene-referred image data generating section 104*a* as a scene-referred image data generating section synthesizes the output-referred image data and differential data inputted from the header information analysis section 102, generates the scene-referred image data, and outputs it to the low- and high-sensitivity scene-referred raw data generating section 104*b*.

The low- and high-sensitivity scene-referred raw data generating section 104*b* as a scene-referred image data generating section refers to the synthesizing information data stored in the synthesizing information data processing section 103, and decomposes the pixels of the scene-referred image data inputted from the scene-referred image data generating section 104*a* into those derived from the low-sensitivity image sensor and those derived from the high-sensitivity image sensor, whereby low-sensitivity scene-referred raw data and high-sensitivity scene-referred raw data are generated.

For example, if a certain pixel is derived from the low-sensitivity image sensor, the pixel of the scene-referred image data does not contain the information of the pixel derived from the high-sensitivity image sensor. To put it another way, the low-sensitivity scene-referred raw data and high-sensitivity scene-referred raw data generated by decomposition is not a perfect reconstruction of the low-sensitivity scene-referred raw data and high-sensitivity scene-referred raw data obtained from the image-capturing apparatuses 21 and 22. Each information set contains missing pixels. However, decomposition into the low-sensitivity scene-referred raw data set and high-sensitivity scene-referred raw data set permits the output-referred image data generating section 107 to apply different image processing to the components derived from the low-sensitivity image sensor and those derived from the high-sensitivity image sensor. Further, if the pixels on the periphery of the missing pixels retain information during decomposition, the information of the missing pixels can be estimated from the pixels on the periphery.

The temporary storage memory 105 temporarily stores the low-sensitivity scene-referred image data and high-sensitivity scene-referred image data generated by the low- and high-sensitivity scene-referred raw data generating section 104*b*.

The second processing section 114 consists of a photographic information data 106, output-referred image data generating section 107 and temporary storage memory 108, as shown in FIG. 11.

The photographic information data 106 determines the photographic information data generation conditions for generating the output-referred image data in response to the photographic conditions, based on the photographic information data inputted from the header information analysis section 102.

The output-referred image data generating section 107 as an output-referred image data generating section reads the low-sensitivity scene-referred raw data and high-sensitivity scene-referred raw data from the temporary storage memory 105, and synthesizes the data by applying correction processing of image sensor characteristics to the low-sensitivity scene-referred raw data and high-sensitivity scene-referred raw data, based on the contents of the correction processing of image sensor characteristics. The output-referred image data generating section 107 further generates the output-referred image data by applying the optimization processing to get the optimum image at the output destination, based on the output-referred image data generating conditions determined in the photographic information data 106 and information on the output destination of the memory device 110, output device 111 and display device 112, inputted from the setting input section 109, and outputs it to the temporary storage memory 108, together with the information on the output destination. The processing of optimization includes compression to the color range of the output destination such as sRGB, ROMM RGB, gradation compression from 16 to 8 bits, reduction in the number of output pixels, and operations performed to conform to the output characteristics (LUT) of the output device and display device. It also includes such image processing as nose reduction, sharpness enhancement, color balancing, color saturation adjustment and dodging.

According to the information of the output destination from the setting input section 109, the temporary storage memory 108 outputs the output-referred image data inputted from the output-referred image data generating section 107 under the control of the control section 116, to any one of the memory device 110, output device 111 and display device 112.

The setting input section 109 is composed of a keyboard and others. When the information on the type of the memory device 110, output device 111 and display device 112 has been inputted, the setting input section 109 outputs this information to the output-referred image data generating section 107. Further, the setting input section 109 is equipped with the same user interface as that shown in FIG. 4. As an instruction input section, the setting input section 109 allows inputting of information for specifying the contents of image processing to be applied to the low-sensitivity scene-referred raw data and high-sensitivity scene-referred raw data, e.g. parameters for adjusting the levels of various forms of image processing such as gradation conversion, smoothing, sharpening, noise elimination and moiré elimination. The inputted information is then outputted to the output-referred image data generating section 107.

The aforementioned categories of the header information analysis section 102, synthesizing information data processing section 103, scene-referred image data generating section 104*a*, photographic information data 106 and output-referred image data generating section 107 need not necessarily be realized as physically independent devices. For example, they can be implemented as types of software processing in a single CPU.

<Operation of Image Processing Apparatus 115>

Figure 12:
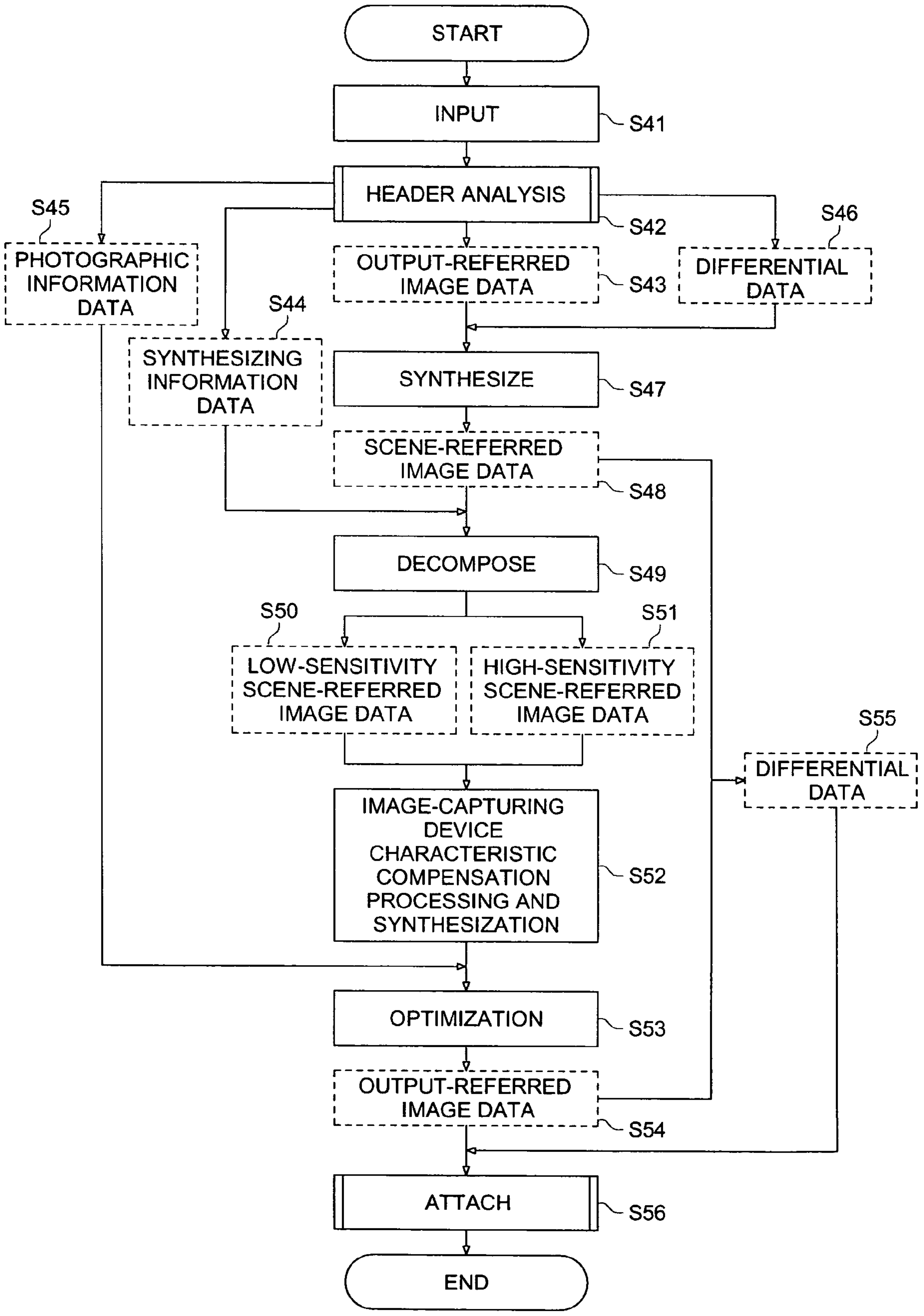
FIG. 12 is a flowchart representing the processing of image data generating performed by cooperation among various parts of the image processing apparatus 115.

FIG. 12 is a flowchart representing the processing of image data generating performed by cooperation among various parts of the image processing apparatus 115. Referring to the drawing, the following describes the operation of the image processing apparatus 115:

When the recording medium having the data structure shown in FIG. 6 or 10 has been mounted, the digital image data file recorded on the recording medium is inputted by the input section 101 (Step S41). Te inputted digital image data has its contents analyzed by the header information analysis section 102 (Step S42), and is decomposed into the output-referred image data (Step S43), synthesizing information data (Step S44), photographic information data (Step S45) and differential data (Step S46). The output-referred image data, synthesizing information data and differential data are sent to the first processing section 113, while the photographic information data (Step S45) is outputted to the second processing section 114.

When synthesizing information data has been inputted to the first processing section 113, it is temporarily stored in the synthesizing information data processing section 103. The output-referred image data and differential data are outputted to the scene-referred image data generating section 104*a* to be synthesized (Step S47); then scene-referred image data is generated (Step S48) In the low- and high-sensitivity scene-referred raw data generating section 104*b*, based on the synthesizing information data stored in the synthesizing information data processing section 103, the pixels of the scene-referred image data is decomposed according to whether they are derived from the low-sensitivity image sensor or the high-sensitivity image sensor (Step S49), whereby low-sensitivity scene-referred raw data and high-sensitivity scene-referred raw data are created (Steps S50 and 51).

The low-sensitivity scene-referred raw data and high-sensitivity scene-referred raw data are outputted to the second processing section 114. In the output-referred image data generating section 107, based on the contents of input from the setting input section 109, correction processing of image sensor characteristics is applied to the low-sensitivity scene-referred raw data and high-sensitivity scene-referred raw data, and synthesization is carried out (Step S52).

The data synthesized by the output-referred image data generating section 107 applies processing of optimization in conformity to the output destination (Step S53), based on the processing conditions determined in the photographic information data 106 and the information on the output destination inputted from the setting input section 109, whereby output-referred image data is generated (Step S54). Further, the differential data between the scene-referred image data generated in Step S48 and output-referred image data created just now is created (Step S55). It is attached to the output-referred image data (Step S56) and is outputted to the device set by the setting input section 109.

It is preferred that, in addition to the differential data, synthesizing information data and photographic information data be attached to the output-referred image data. This arrangement allows the output-referred image data to be created again from the low-sensitivity scene-referred raw data and high-sensitivity scene-referred raw data at the output destination.

As described above, the image processing apparatus 115 allows the low-sensitivity scene-referred raw data and high-sensitivity scene-referred raw data of wide dynamic range to be created again from the output-referred image data, differential data, synthesizing information data and photographic information data (when the data from image-capturing apparatus 22 is utilized) outputted from the image-capturing apparatuses 21 and 22. Synthesization can be carried out by applying desired correction processing of image sensor characteristics to the low-sensitivity scene-referred raw data and high-sensitivity scene-referred raw data of wide dynamic range, and processing of optimization in conformity to the output destination can be applied to generate output-referred image data. Thus, the image data of wide dynamic range obtained from the image-capturing apparatuss 21 and 22 can be used for printing in general households and workplaces.

<Configuration of Image Recording Apparatus 201>

Figure 13:
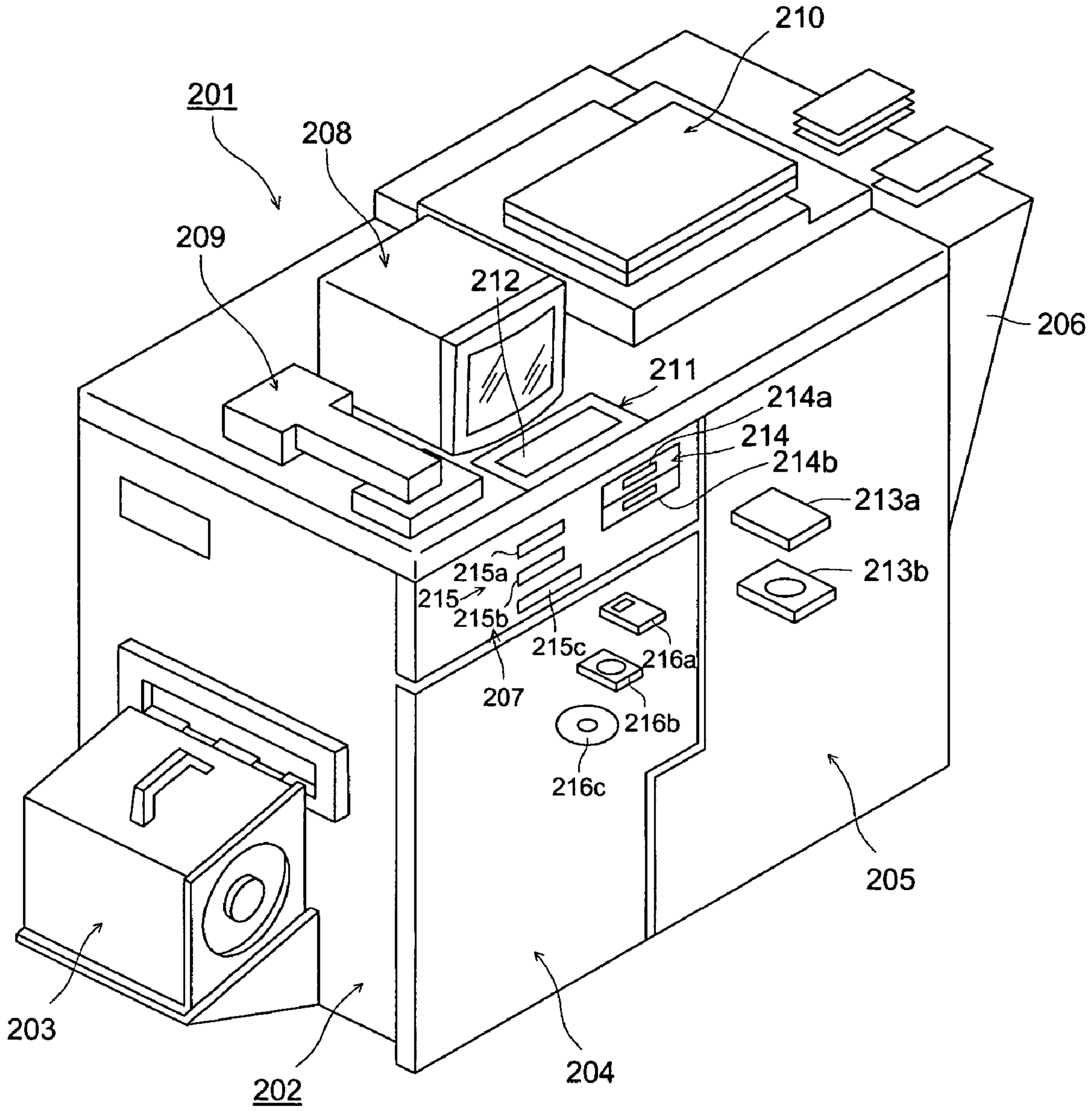
FIG. 13 is a perspective view showing the external appearance of an image recording apparatus embodied in the present invention.

The following describes the preferred embodiments of the image recording apparatus of the present invention: FIG. 13 is an external perspective view representing an image recording apparatus 201 of the present invention. The image recording apparatus 201 in the present embodiment provides an example of the image recording apparatus equipped with a CRT display monitor as a display device and an output device using silver halide photographic paper as an output media.

In the image recording apparatus 201, a magazine loading section 203 is installed on the left side surface of the main unit 202. An exposure processing section 204 for causing the silver halide photographic paper as an output medium to be exposed to light, and a print creating section 205 for creating a print by developing and drying the exposed silver halide photographic paper are installed inside the main unit 202. The created print is ejected onto the tray 206 mounted on the right side of the main unit 202. Further, a control section 207 is provided on the upward position of the exposure processing section 204 inside the main unit 202.

A CRT 208 is arranged on the top of the main unit 202. It has the function of display means for displaying on the screen the image of the image information to be printed. A film scanner 209 as a transparent document reader is mounted on the left of the CRT 208, and a reflected document input apparatus 210 is arranged on the right.

One of the documents read from the film scanner 209 and reflected document input apparatus 210 is a photosensitive material. The photographic material includes a color negative, color reversal film, black-and-white negative, black-and-white reversal film. Frame image information captured by an analog camera is recorded on the photographic material. The film scanner of the film scanner 209 converts this recorded frame image information into digital image data and creates frame image data. When the photographic material is color paper as silver halide photographic paper, it can be converted into frame image data by the flat head scanner of the reflected document input apparatus 210.

An image reader 214 is mounted where the control section 207 of the main unit 202 is located. The image reader 214 is provided with a PC card adaptor 214*a* and a floppy (registered trademark) disk adaptor 214*b* to ensure that a PC card 213*a* and floppy disk 213*b* can be inserted into position. The PC card 213*a* has a memory where multiple items of frame image data obtained by photographing with a digital camera are stored. The floppy disk 213*b* stores multiple items of frame image data obtained by photographing with a digital camera.

An operation section 211 is arranged forwardly of the CRT 208. This operation section 211 is equipped with an information input section 212, which consists of a touch panel and others.

The recording medium storing the frame image data of the present invention other than the above-mentioned data includes a multimedia card, memory stock, MD data and CD-ROM. The operation section 211, CRT 208, film scanner 209, reflected document input apparatus 210 and image reader 214 is mounted integrally on the main unit 202. Any one of them can be installed as a separate unit.

An image write section 215 is mounted where the control section 207 of the main unit 202 is located. The image write section 215 is equipped with a floppy disk adaptor 215*a*, MO adaptor 215*b*, and optical disk adaptor 215*c* so that an FD 216*a*, MO 216*b* and optical disk 216*c* can be inserted into position, and Image information can be written on the image recording medium.

Further, the control section 207 has means for communication (not illustrated). It receives image data representing the captured image and print instruction directly from another computer in the facilities or a remote computer through the Internet, and is capable of functioning as a so-called network image output apparatus.

<Internal Configuration of Image Recording Apparatus 201>

The following describes the internal structure of the image recording apparatus 201.

Figure 14:
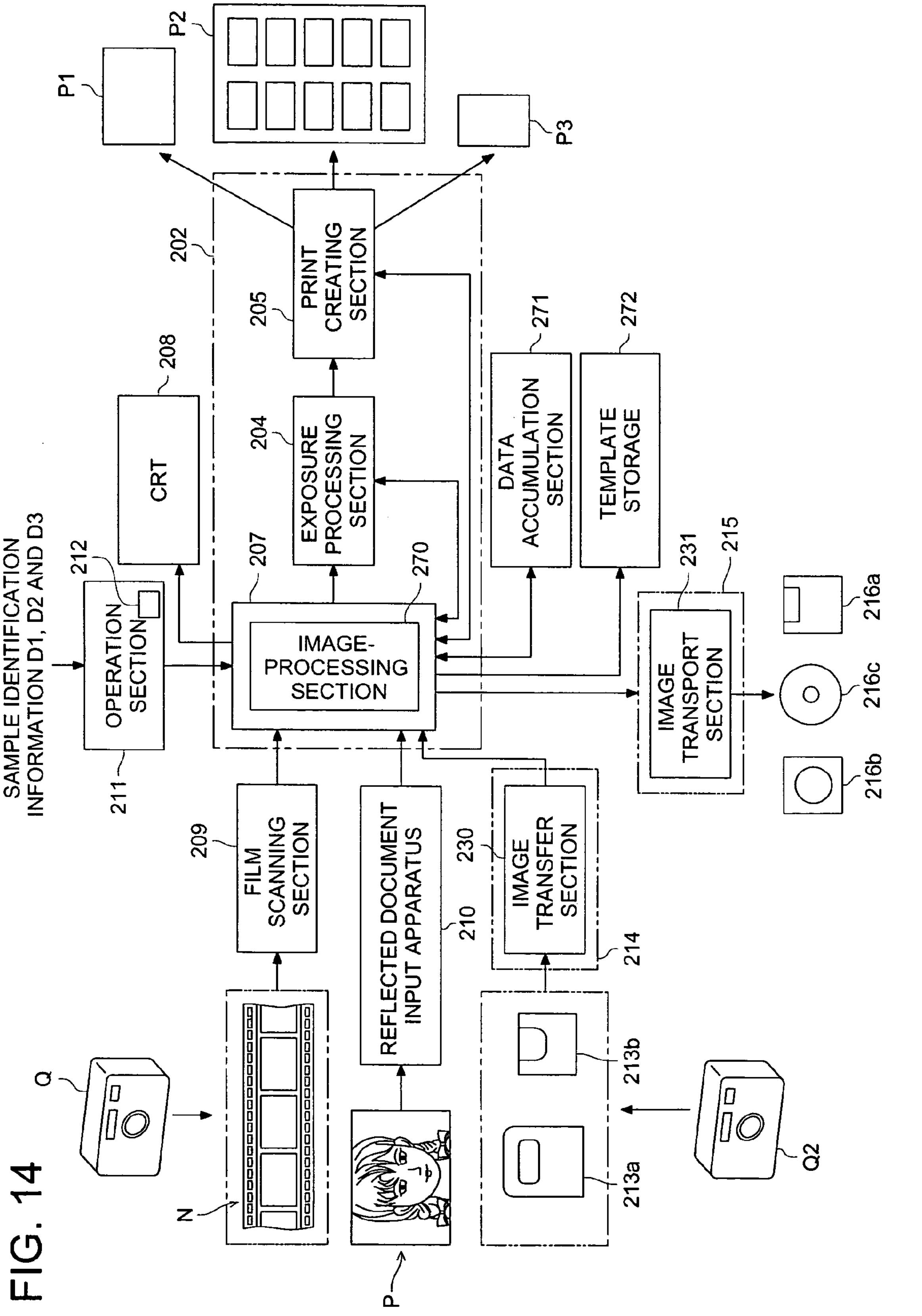
FIG. 14 is an internal configuration representing an image recording apparatus 201 shown in FIG. 11.

FIG. 14 is a block diagram representing the internal configuration of the image recording apparatus 201.

The control section 207 of the image recording apparatus 201 comprises a CPU (Central Processing Unit) and memory section. The CPU reads the various types of control programs stored in the memory section and centrally controls the components constituting the image recording apparatus 201 in conformity to the control program.

Figure 15:
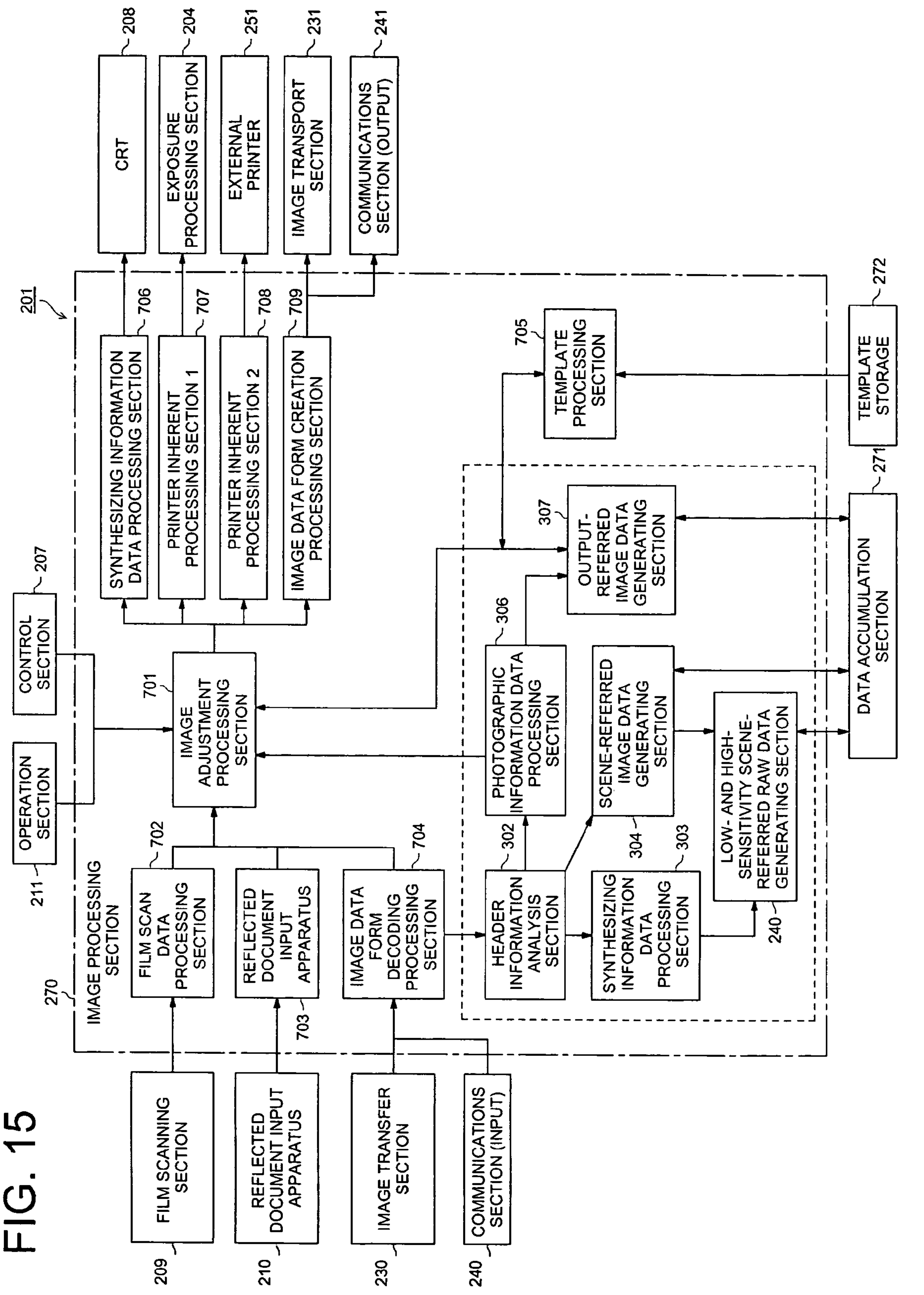
FIG. 15 is a block diagram showing the functional configuration of the image processing apparatus embodied in the present invention.

The control section 207 has an image processing section 270. Image processing is applied to:

the image data gained by allowing the document image to be read by the film scanner 209 and reflected document input apparatus 210 based on the input signal from the information input means 12 of the operation section 211;

the image data read from the image reader 214; and the image data inputted from the external equipment through and communications means (input) 240 (illustrated in FIG. 15). In the image processing apparatus 270, conversion processing in conformity to the output format is applied to the image data subjected to image processing, and the result is output as prints P1, P2 and P3 or by the monitor 208, image write section 215 and communications section (output) 241.

The operation section 211 is provided with an information input section 212. The information input section 212 comprises a touch panel, and the signal of depressing the information input section 212 is outputted to the control section 207 as an input signal. It is also possible to arrange such a configuration that the operation section 211 is equipped with a keyboard or mouse. The operation section 211 serves as an instruction inputting means for inputting instructed contents of the correction processing of image sensor characteristics, to be applied to the low-sensitivity scene-referred low data and the high-sensitivity scene-referred low data, from the inputting screen shown in FIG. 4.

The film scanner 209 reads the frame image data from the developed negative film N gained by an analog camera. From the reflected document input apparatus 210, the film scanner 209 reads the frame image data from the print P subjected to the processing of development with the frame image printed on the color paper as silver halide photographic paper.

The image reader 214 has a function of reading the frame image data of the PC card 213*a* and floppy disk 213*b* photographed and stored by the digital camera. Namely, the image reader 214 is equipped with a PC card adaptor and floppy disk adaptor as image transfer sections 230. It reads the frame image data recorded on the PC card 213*a* and floppy disk 213*b* mounted on the floppy disk adaptor 214*b*, and transfers it to the control section 207. A PC card reader or a PC cad slot, for example, is used as the PC card adaptor 214*a*.

The data storage section 271 memorizes image information and its corresponding order information (information on the number of prints to be created from the image of a particular frame) and stores them sequentially.

The template memory section 272 memorizes the sample image data (data showing the background image and illustrated image) corresponding to the types of information on sample identification D1, D2 and D3, and memorizes at least one of the data items on the template for setting the composite area with the sample image data. When a predetermined template is selected from among multiple templates previously memorized in the template memory section 272 by the operation by the operator (based on the instruction of a client), the control section 207 performs merging between the frame image information and the selected template. When the types of information on sample identification D1, D2 and D3 have been specified by the operation by the operator (based on the instruction of a client), the sample image data is selected in conformity to the specified types of information on sample identification D1, D2 and D3. Merging of the selected sample image data, image data ordered by a client and/or character data is carried out and, as a result, a print in conformity to the sample image data desired by the client is created. Merging by this template is performed by the widely known chromakey technique.

Sample identification information is not restricted to three types of information on sample identification D1, D2 and D3. More than three types or less than three types can be used. The types of information on sample identification D1, D2 and D3 for specifying the print sample are arranged to be inputted from the operation section 211. Since the types of information on sample identification D1, D2 and D3 are recorded on the sample or order sheet, they can be read by the reading section such as an OCR. Alternatively, they can be inputted by the operator through a keyboard.

As described above, sample image data is recorded in response to sample identification information D1 for specifying the print sample, and the sample identification information D1 for specifying the print sample is inputted. Based on the inputted sample identification information D1, sample image data is selected, and the selected sample image data and image data and/or character data based on the order are merged to create a print according to the specified sample. This procedure allows a user to directly check full-sized samples of various dimensions before placing an order. This permits wide-ranging user requirements to be satisfied.

The first sample identification information D2 for specifying the first sample, and first sample image data are memorized; alternatively, the second sample identification information D3 for specifying the second sample, and second sample image data are memorized. The sample image data selected on the basis of the specified first and second sample identification information D2 and D3, and ordered image data and/or character data are merged with each other, and a print is created according to the specified sample. This procedure allows a greater variety of images to be created, and permits wide-ranging user requirements to be satisfied.

In the exposure processing section 204, the photographic material is exposed and an image is formed thereon in conformity to the output image data generated by image processing of image data by the image processing section 270. This photographic material is sent to the print creating section 205. The print creating section 205 develops ad dries the exposed photographic material to create prints P1, P2 and P3. Print P1 is available in a service size, high-vision size or panorama size. Print P2 is an A4-sized print, print P3 is a business card-sized print (2 in.×3 in.).

Print sizes are not restricted to P1, P2 and P3. Other sized prints can also be used.

The monitor 208 displays the image information inputted from the control section 207.

The image write section 215 is provided with a floppy disk adaptor 215*a*, MO adaptor 215*b*, and optical disk adaptor 215*c* as an image transfer section 231 so that the FD 216*a*, MO 216*b* and optical disk 216*c* can be inserted. This allows the image data to be written on the image recording medium.

Using the communications means (input) 240 (illustrated in FIG. 15), the image processing apparatus 270 receives image data representing the captured image and printing and other work instruction directly from another computer in the facilities or from a remote computer through Internet, and is cable of performing image processing and printing in the remote control mode.

Using the communications means (input) 240 (illustrated in FIG. 15), the image processing apparatus 270 is capable of sending the image data representing the photographed image after image processing of the present invention has been applied, and accompanying order information, to another computer in the facilities or a remote computer through Internet.

As described in the above, the image recording apparatus 201 is provided with: an input section for capturing the digital image data of various types and image information obtained by dividing the image document and measuring a property of light; an image processing section for processing the information on the input image captured from this input section in such a way that this image will provide a favorable impression when viewed on the outputting medium, by getting or estimating the information on "size of the output image" and "size of the major subject in the output image"; an image outputting section for displaying or printing out and measuring a property of light, or writing it on the image recording medium; and a communications section (output) for sending the image data and accompanying order information to another computer in the facilities through a communications line or a remote computer through Internet.

<Configuration of Image Processing Apparatus 270>

FIG. 15 is a block diagram representing the functional configuration of an image processing apparatus 270 of the present invention. The image data inputted from the film scanner 209 is subjected to calibration inherent to the film scanner, negative/positive reversal of a negative document, removal of dust and scratch, gray balance adjustment, contrast adjustment, removal of granular noise an enhancement of sharpness in the film scan data processing section 702, and is sent to the image adjustment processing section 701. The film size, negative/positive type, information on the major subject recorded optically or magnetically on the film and information on photographing conditions (e.g. information described on the APS) are outputted to the image adjustment processing apparatus 701.

The image data inputted from the reflected document input apparatus 210 is subjected to calibration inherent to a reflected document input apparatus negative/positive reversal of a negative document, removal of dust and scratch, gray balance adjustment, contrast adjustment, removal of granular noise an enhancement of sharpness in the film scan data processing section 702 in the reflected document scanned data processing section 703, and the result is outputted to the image adjustment processing section 701.

The image data inputted from the image transfer section 230 and communications section (input) is subjected to decompression of the compressed symbols or conversion of the color data representation method, as required, according to the form of the data in the image data form deciphering processing section 704. It is converted into the data format suitable for numerical computation inside the image processing section 270 and is outputted to the image adjustment processing apparatus 701. The image data form deciphering processing section 704 determines whether or not the image data of the format according to the image-capturing apparatuses 21 and 22 has been inputted from the image transfer section 230 and communications means (input) 240, and outputs the inputted image data to the header information analysis section 302. The header information analysis section 302 analyzes the image-capturing characteristic compensation data d1 and image-capturing information data d3 from the inputted image data. The header information analysis section 302 analyzes the inputted data, and then, outputs the output-referred image data and the differential data to scene-referred image data generating section 304, the synthesizing information data to synthesizing information data processing section 303 and the image-capturing information data to the image-capturing information data processing section, respectively.

Designation of the size of output image is inputted from the operation section 211. Further, if there is designation of the size of the output image sent to the communications means (input) 240 or the output image embedded in the header/tag information of the image data obtained through the image transfer section 230, the image data form deciphering processing section 704 detects the information and sends it to the image adjustment processing apparatus 701.

The synthesizing information data analyzed by a header information analysis section 302 is outputted by a synthesizing information data processing section 303 and is temporarily stored. The output-referred image data and differential data analyzed by the header information analysis section 302 are outputted to a scene-referred image data generating section 304, and scene-referred image data is generated by synthesization. The generated scene-referred image data is decomposed into the components derived from the low-sensitivity image sensor and those derived from the high-sensitivity image sensor, based on the synthesizing information data stored in the synthesizing information data processing section 303, by a low- and high-sensitivity scene-referred raw data generating section 305 as a scene-referred raw data generated section, whereby low-sensitivity scene-referred raw data and high-sensitivity scene-referred raw data are created. They are then outputted to a data accumulation section 271.

The photographic information data analyzed by the header information analysis section 302 is outputted to the photographic information data processing section 306, where the image processing conditions on generation of output-referred image data is determined.

Based on the instruction from the operation section 211 and control section 207, the image adjustment processing section 701 transfers the image processing conditions for creating the output-referred image data conforming to the device of the output destination and output medium, from the low-sensitivity scene-referred raw data and high-sensitivity scene-referred raw data generated by the low- and high-sensitivity scene-referred raw data generating section 305, to the output-referred image data generating section 307.

Based on the image processing conditions created as output-referred image data by the photographic information data processing section 306 and image processing conditions sent from the image adjustment processing section 701, the output-referred image data generating section 307 synthesizes and standardizes the low-sensitivity scene-referred raw data and high-sensitivity scene-referred raw data, and optimizes them, thereby generating output-referred image data.

The image adjustment processing apparatus 701 calls a predetermined image data (template) from the template memory section 272 when template processing is required. Image data is sent to the template processing section 705. It is merged with the template, and the image data subsequent to template processing is again received. In response to the instruction from the operation section 211 and control section 207, the image adjustment processing apparatus 701 applies image processing to the image data received from the film scanner 209, image transfer section 230, communications means (input) 240 and template processing section 705, in such a way that the image will provide a favorable impression when viewed on the outputting medium. Then the digital image data to be outputted is generated, and is sent to the CRT inherent processing section 706, printer inherent processing section (1) 707, image data form creation processing section 709 and data storage section 271.

The CRT inherent processing section 706 applies processing of changing the number of pixels or color matching to the image data received from the image adjustment processing apparatus 701, as required. Then the image data for display merged with the information requiring control information, etc. is sent to the CRT 208, serving as an image-forming means. The printer inherent processing section (1) 707 provides processing of printer inherent calibration, color matching and change in the number of pixels, as required, and sends image data to the exposure processing section 204, serving as an image-forming means. When an external printer 251 such as a large-format inkjet printer, serving as an image-forming device, is to be connected to the image recording apparatus 201, a printer inherent processing section (2) 708 is provided for each printer to be connected, so that adequate printer inherent calibration, color matching, change in the number of pixels and other processing can be carried out.

The image data form creation processing section 709 converts the image data received from the image adjustment processing apparatus 701, into various types of general-purpose image format represented by JPEG, TIFF and Exif as required. Then the image data is sent to the image transfer section 231 and communications means (input) 241.

The image data created by the output-referred image data generating section 307 assumes processing by the CRT inherent processing section 706, printer inherent processing section (1) 707, printer inherent processing section (2) 708 and image data form creation processing section 709. The image data form creation processing section 709 attaches to this image data the status file identifying the optimized image data for CRT, exposure output section, external printer, communications means (output) and others, based on output-referred image data d5, and sends the resultant image data separately to the image transfer section.

The above-mentioned division into the film scan data processing section 702, reflected document scanned data processing section 703, image data form deciphering processing section 704, image adjustment processing apparatus 701, CRT inherent processing section 706, printer inherent processing section (1) 707, printer inherent processing section (2) 708 and image data form creation processing section 709 is assumed to assist understanding of the functions of the image processing section 270. They need not necessarily be realized as physically independent devices. For example, they can be realized in the form of a division of the type of software processing in a single CPU.

The division of the header information analysis section 302, apparatus characteristic compensation processing 303*a*, image-capturing data processing section 306, scene-referred image data generating section 304, low- and high-sensitivity scene-referred raw data generating section 305, and output-referred image data generating section 307 is assumed to assist understanding of the functions of the image processing section 270 of the present invention. They need not necessarily be realized as physically independent devices. For example, they can be realized in the form of a division of the type of software processing in a single CPU.

<Operation of Image Processing Section 270>

Figure 16:
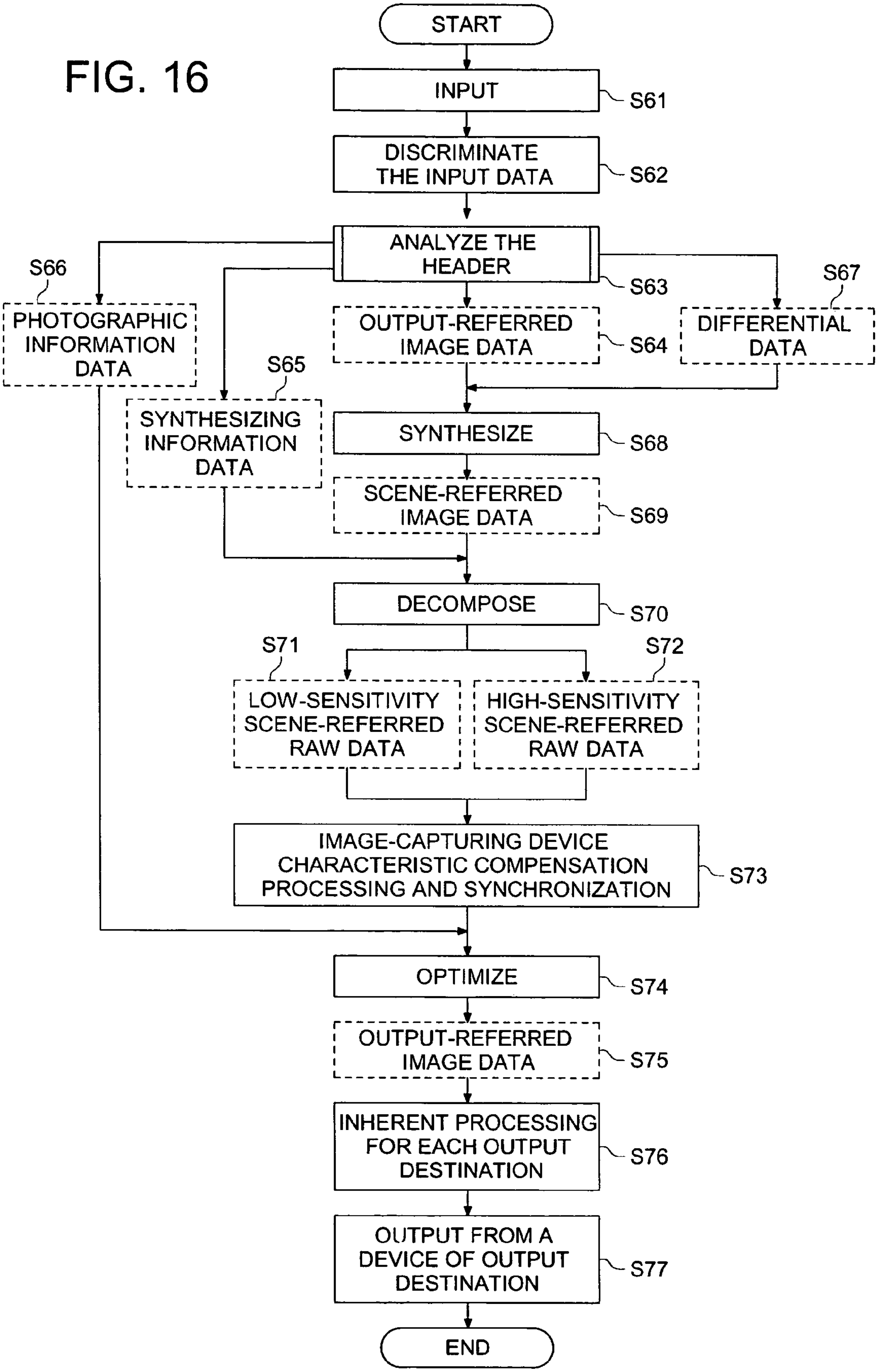
FIG. 16 is a flowchart showing the processing of forming the image data performed by the cooperation of various components of an image recording apparatus 201.

FIG. 16 is a flowchart showing the processing of forming the image data performed by the cooperation of various components of an image recording apparatus 270. Referring to the drawing, the following describes the operations of various parts of the image processing section 270.

Data is inputted into the image processing section 270 from the image transfer section 230 or communications section (input section) (Step S61). When this input data has been determined as a digital image data file by the aforementioned image-capturing apparatus 21 or 22 by the image data form decoding processing section 704 (Step S62), the inputted digital image data file has its contents analyzed by the header information analysis section 302 (Step S63), and is decomposed into output-referred image data (Step S64), synthesizing information data (Step S65), photographic information data (Step S66) and differential data (Step S67). The output-referred image data and differential data are outputted to the scene-referred image data generating section 304, and the synthesizing information data to the synthesizing information data 303, and the photographic information data to the photographic information data processing section 306, respectively.

The synthesizing information data is temporarily stored in the synthesizing information data 303. The output-referred image data and differential data are synthesized by the scene-referred image data generating section 304 (Step S68), and scene-referred image data is generated (Step S69). Then based on the synthesizing information data stored in the synthesizing information data 303, the low- and high-sensitivity scene-referred raw data generating section 305 allows the pixels of the scene-referred image data to be decomposed according to whether they are derived from the low-sensitivity image sensor or high-sensitivity image sensor (Step S70), whereby low-sensitivity scene-referred raw data and high-sensitivity scene-referred raw data are generated (Steps S71 and 72).

The photographic information data is outputted to the photographic information data processing section 306, and determines the processing conditions for the photographic information data processing section 306 to generate the output-referred image data conforming to the photographic conditions, based on the photographic information data. Further, according to the instruction from the operation sections 211 and 207, the image adjustment processing section 701 determines the conditions for correction processing of image sensor characteristics to be applied to the low-sensitivity scene-referred raw data and high-sensitivity scene-referred raw data; the image processing conditions for generating the output-referred image data applied to the output device and output medium; and the image processing conditions for conversion into the color space such as sRGB and ROMM RGB in response to the output device. The generated low-sensitivity scene-referred raw data and high-sensitivity scene-referred raw data are outputted to the output-referred image data generating section 307, and undergoes correction processing of image sensor characteristics based on the conditions for correction processing of image sensor characteristics generated by the image adjustment processing section 701, whereby synthesization is carried out (Step S73).

According to the image processing conditions from the image adjustment processing section 701, the data synthesized by the output-referred image data generating section 307 is subjected to processing of optimization (Step S74), and output-referred image data is generated (Step S75). It is outputted to any one of a CTR inherent processing section 706, printer inherent processing section 707, printer inherent processing section 708 and image data form creation processing section 709 in response to the output destination. The output-referred image data is subjected to inherent processing in conformity to the output destination by the processing section to which it has been outputted (Step S76), and is outputted from the output destination specified by the operation section 211 (Step S77).

As described above, the image recording apparatus 201 allows the low-sensitivity scene-referred raw data and high-sensitivity scene-referred raw data of wide dynamic range to be again generated from the output-referred image data, differential data, synthesizing information data and photographic data (when using the data of the image-capturing apparatus 22) outputted by the aforementioned image-capturing apparatuses 21 and 22. Synthesization is carried out by applying desired correction processing of image sensor characteristics to the image data of wide dynamic range. Then processing of optimization in conformity to the outputted destination is applied to form an output-referred image quickly on the output medium including a display device such as CRT, liquid crystal display and plasma display, as well as paper for hardcopy image generation such as silver halide photographic paper, inkjet paper and thermal printer paper. This arrangement makes it possible to provide the services of offering the optimized output-referred image data and prints without losing the image information obtained from photographing by the image-capturing apparatuses 21 and 22, in the same way as the services based on the conventional digital Mini-lab.

As described above, the image-capturing apparatus of the present invention allows a wide dynamic range image without information loss to be recorded by generating the scene-referred raw data as direct raw output data of the image sensor that records the faithful information on a subject, for each of the image sensors, sensitivities of which are different relative to each other. Further, a quick display of the photographed image is enabled by the generation of the output-referred image data optimized for viewing on the output medium such as a camera monitor through generation of a scene-referred image data set of a standardized form synthesized by combining the scene-referred raw data sets. Further, the apparatus records the information on whether each pixel of the scene-referred image data is derived from low-sensitivity or high-sensitivity device and obtains the difference between the scene-referred image data and output-referred image data. Such information is recorded in the form associated with the output-referred image data. This makes it possible to retain information at the time of photographing. Further, the photographic information data can be outputted. This arrangement allows the output-referred image data to be produced in conformity to the photographing conditions when an image is created again from the output-referred image data in an external apparatus.

The image processing apparatus of the present invention permits the scene-referred image data to be generated from the output-referred image data and differential data outputted by the aforementioned image-capturing apparatus. It further permits this scene-referred image data to be decomposed according to the inputted synthesizing information data, and applies processing of optimization conforming to the outputted destination, to the decomposed scene-referred raw data for each sensitivity level. This arrangement ensures easy editing and processing of the image data of wide dynamic range outputted from the image-capturing apparatus, and hence generates the optimized output-referred image data without losing the captured image information so that this image data can be outputted on all commonly known output media including a display device such as CRT, liquid crystal display and plasma display, as well as paper for hardcopy image generation such as silver halide photographic paper, inkjet paper and thermal printer paper. Thus, the wide dynamic range image data outputted from the image-capturing apparatus can be used for printing in general households and workplaces.

The image recording apparatus of the present invention allows the synthesized scene-referred image data set of a standardized form to be generated from the output-referred image data and differential data outputted from the aforementioned image-capturing apparatus. It further permits this scene-referred image data to be decomposed according to the inputted synthesizing information data, and applies processing of optimization conforming to the outputted destination, to the decomposed scene-referred raw data for each sensitivity level, whereby new output-referred image data is generated. The generated output-referred image data is used to for an output-referred image on the output medium. This arrangement ensures easy editing and processing of the image data of wide dynamic range outputted from the image-capturing apparatus, and allows optimized output-referred image data to be generated, without losing the captured image information, on a display device such as CRT, liquid crystal display and plasma display, as well as paper for hardcopy image generation such as silver halide photographic paper, inkjet paper and thermal printer paper, whereby quick formation of an output-referred image can be achieved.

A test was conducted to create a silver halide print from the image data obtained from the digital camera to which the present invention was applied, using the image processing apparatus of the present invention. This test has been shown, unexpectedly enough, that there is a considerable reduction of a skip on highlighted side or a blur on the shadow side, thereby ensuring a substantial improvement of the silver halide print quality.

In another test, the present invention was applied to the film scanner to create a silver halide print using the image processing apparatus of the present invention. It has been shown, again surprisingly enough, that granular noise caused by the film, as well as a skip on highlighted side or a blur on the shadow side, can also be reduced effectively.

Disclosed embodiment can be varied by a skilled person without departing from the spirit and scope of the invention.

What is claimed is:

1. An image capturing apparatus having plural kinds of image sensors, sensitivities of which are different relative to each other, comprising:

a scene-referred raw data generating section to generate scene-referred raw data sets, each of which is acquired from each of said plural kinds of image sensors through an image capturing operation;

a scene-referred image data synthesizing section to synthesize scene-referred image data by combining at least two of said scene-referred raw data sets with each other into a standardized form;

a synthesizing-information data generating section to generate synthesizing-information data for decomposing said scene-referred image data into said at least two of said scene-referred raw data sets;

an output-referred image data generating section to generate output-referred image data by applying an optimization processing to said scene-referred image data, so that a visual image optimized for an output medium can be formed on said output medium, based on said output-referred image data;

a differential data generating section to generate differential data between said scene-referred image data and said output-referred image data; and a controlling section to control a data-recording operation, so that said synthesizing-information data and said differential data are attached to said output-referred image data in order to store all of them into a storage medium.

2. The image-capturing apparatus of claim 1, wherein said controlling section controls said data-recording operation, so that image-capturing information data, representing an image-capturing condition, are also attached to said output-referred image data in order to store all of them into a storage medium.

3. The image-capturing apparatus of claim 1, wherein said plural kinds of image sensors include a high-sensitive image sensor and a low-sensitive image sensor; and wherein said scene-referred raw data sets include a high-sensitivity scene-referred raw data set, acquired from said high-sensitive image sensor through said image-capturing operation, and a low-sensitivity scene-referred raw data set, acquired from said low-sensitive image sensor through said image-capturing operation.

4. The image-capturing apparatus of claim 3, wherein said high-sensitivity scene-referred raw data set represents a monochrome image, which includes only luminance information captured through said image-capturing operation, while said low-sensitivity scene-referred raw data set represents a color image captured through said image-capturing operation.

5. The image-capturing apparatus of claim 3, wherein said high-sensitive image sensor includes a plurality of first photosensitive elements and said low-sensitive image sensor includes a plurality of second photosensitive elements; and wherein said plurality of first photosensitive elements and said plurality of second photosensitive elements are arranged within a same image area in such a manner that said first photosensitive elements and said second photosensitive elements are staggered relative to each other in both horizontal and vertical directions of said image area, like as a honeycomb pattern.

6. The image-capturing apparatus of claim 1, further comprising:

an instruction inputting section to input instructed contents of an correction processing of image sensor characteristics into said scene-referred image data synthesizing section;

wherein said scene-referred image data synthesizing section applies said correction processing of said image sensor characteristics to said at least two of said scene-referred raw data sets, based on said instructed contents inputted by said instruction inputting section, before combining them with each other.

7. The image-capturing apparatus of claim 1, wherein a color space of said scene-referred image data is defined by anyone of scRGB, RIMM RGB, ERIMM RGB, and a color space of said output-referred image data includes anyone of sRGB, ROMM RGB.

8. The image-processing apparatus of claim 1, wherein a color space of said scene-referred image data is defined by anyone of scRGB, RIMM RGB, ERIMM RGB, and a color space of said output-referred image data includes anyone of sRGB, ROMM RGB.

9. An image-processing apparatus, comprising:

an inputting section to input output-referred image data generated by an image-capturing apparatus having plural kinds of image sensors whose sensitivities are different relative to each other, differential data attached to said output-referred image data, and synthesizing-information data for decomposing scene-referred image data, which are generated by processing both said output-referred image data and said differential data, into a plurality of scene-referred raw data sets;

a scene-referred image data synthesizing section to synthesize scene-referred image data by combining said output-referred image data and said differential data with each other into a standardized form;

a scene-referred raw data generating section to generate said plurality of scene-referred raw data sets, by decomposing said scene-referred image data, based on said synthesizing-information data; and an output-referred image data generating section to generate new output-referred image data by applying an optimization processing to said plurality of scene-referred raw data sets, so that a visual image optimized for an output medium can be formed on said output medium, based on said new output-referred image data.

10. The image-processing apparatus of claim 9, wherein said inputting section also inputs image-capturing information data representing an image-capturing condition; and wherein said output-referred image data generating section employs said image-capturing information data when applying said optimization processing to said plurality of scene-referred raw data sets, in order to generate said new output-referred image data.

11. The image-processing apparatus of claim 9, wherein said plural kinds of image sensors include a high-sensitive image sensor and a low-sensitive image sensor; and wherein said scene-referred raw data sets include a high-sensitivity scene-referred raw data set, acquired from said high-sensitive image sensor, and a low-sensitivity scene-referred raw data set, acquired from said low-sensitive image sensor.

12. The image-processing apparatus of claim 11, wherein said high-sensitivity scene-referred raw data set represents a monochrome image, which includes only luminance information of a captured image, while said low-sensitivity scene-referred raw data set represents a color image.

13. The image-processing apparatus of claim 9, further comprising:

an instruction inputting section to input instructed contents of an correction processing of image sensor characteristics into said output-referred image data generating section;

wherein said output-referred image data generating section applies said correction processing of said image sensor characteristics to said plurality of scene-referred raw data sets, based on said instructed contents inputted by said instruction inputting section, before applying said optimization processing to them.

14. An image-recording apparatus, comprising:

an inputting section to input output-referred image data generated by an image-capturing apparatus having plural kinds of image sensors whose sensitivities are different relative to each other, differential data attached to said output-referred image data, and synthesizing-information data for decomposing scene-referred image data, which are generated by processing both said output-referred image data and said differential data, into a plurality of scene-referred raw data sets;

a scene-referred image data synthesizing section to synthesize scene-referred image data by combining said output-referred image data and said differential data with each other into a standardized form;

a scene-referred raw data generating section to generate said plurality of scene-referred raw data sets, by decomposing said scene-referred image data, based on said synthesizing-information data;

an output-referred image data generating section to generate new output-referred image data by applying an optimization processing to said plurality of scene-referred raw data sets; and an image-forming section to form an visual image on an output medium, based on said new output-referred image data optimized for said output medium.

15. The image-recording apparatus of claim 14, wherein said inputting section also inputs image-capturing information data representing an image-capturing condition; and wherein said output-referred image data generating section employs said image-capturing information data when applying said optimization processing to said plurality of scene-referred raw data sets, in order to generate said new output-referred image data.

16. The image-recording apparatus of claim 14, wherein said plural kinds of image sensors include a high-sensitive image sensor and a low-sensitive image sensor; and wherein said scene-referred raw data sets include a high-sensitivity scene-referred raw data set, acquired from said high-sensitive image sensor, and a low-sensitivity scene-referred raw data set, acquired from said low-sensitive image sensor.

17. The image-recording apparatus of claim 16, wherein said high-sensitivity scene-referred raw data set represents a monochrome image, which includes only luminance information of a captured image, while said low-sensitivity scene-referred raw data set represents a color image.

18. The image-recording apparatus of claim 14, further comprising:

an instruction inputting section to input instructed contents of an correction processing of image sensor characteristics into said output-referred image data generating section;

wherein said output-referred image data generating section applies said correction processing of said image sensor characteristics to said plurality of scene-referred raw data sets, based on said instructed contents inputted by said instruction inputting section, before applying said optimization processing to them.

19. The image-recording apparatus of claim 14, wherein a color space of said scene-referred image data is defined by anyone of scRGB, RIMM RGB, ERIMM RGB, and a color space of said output-referred image data includes anyone of sRGB, ROMM RGB.

* * * * *